United States Patent
Zhu et al.

(10) Patent No.: US 7,557,881 B2
(45) Date of Patent: Jul. 7, 2009

(54) MULTI-FILM COMPENSATED LIQUID CRYSTAL DISPLAY WITH INITIAL HOMOGENEOUS ALIGNMENT

(75) Inventors: Xinyu Zhu, Orlando, FL (US); Shin-Tson Wu, Oviedo, FL (US)

(73) Assignees: University of Central Florida Research Foundation, Inc., Orlando, FL (US); Toppoly Optoelectronics, Corp., Miao-Li (TW)

( * ) Notice: Subject to any disclaimer, the term of this patent is extended or adjusted under 35 U.S.C. 154(b) by 0 days.

(21) Appl. No.: 11/980,942

(22) Filed: Oct. 31, 2007

(65) Prior Publication Data

US 2008/0158491 A1    Jul. 3, 2008

Related U.S. Application Data

(62) Division of application No. 10/979,482, filed on Nov. 2, 2004, now Pat. No. 7,450,204.

(51) Int. Cl.
  *G02F 1/1335* (2006.01)
(52) U.S. Cl. ............... 349/117; 349/118; 349/119; 349/120; 349/121
(58) Field of Classification Search ........ 349/117, 349/118, 119
  See application file for complete search history.

(56) References Cited

U.S. PATENT DOCUMENTS

| | | | |
|---|---|---|---|
| 5,138,474 A | 8/1992 | Arakawa | |
| 5,557,434 A | 9/1996 | Winker et al. | |
| 5,570,214 A | 10/1996 | Abileah et al. | |
| 5,583,679 A | 12/1996 | Ito et al. | |
| 5,600,464 A | 2/1997 | Ohe | 349/123 |
| 5,612,801 A * | 3/1997 | Winker | 349/119 |
| 5,886,762 A | 3/1999 | Lee | 349/145 |
| 6,292,242 B1 * | 9/2001 | VanderPloeg et al. | 349/118 |
| 6,741,311 B1 | 5/2004 | Hong et al. | |
| 7,397,524 B2 * | 7/2008 | Jeon et al. | 349/119 |
| 2002/0167620 A1 | 11/2002 | Anderson et al. | |

(Continued)

OTHER PUBLICATIONS

M. Oh-E, et al., Principles and Characteristics of Electro-Optical Behavior with In-Plane Switching Mode, Asia Display, 1995, pp. 577-280, vol. 95.

(Continued)

*Primary Examiner*—David Nelms
*Assistant Examiner*—Hoan C Nguyen
(74) *Attorney, Agent, or Firm*—Brian S. Steinberger; Phyllis K. Wood; Law Offices of Brian S. Steinberger, P.A.

(57) ABSTRACT

A liquid crystal display having a positive A-film and a negative A-film between a top polarizer and a bottom polarizer to increase the viewing angle of the liquid crystal display by reducing or eliminating light leakage at voltage-off state when viewed from an oblique angle. Method of increasing the viewing angle of the liquid crystal display by reducing or eliminating light leakage at voltage-off stage when viewed from an oblique angle. The compensation is applicable to use with liquid crystal displays having a liquid crystal layer that is homogenously aligned at off-state when no voltage is applied to the liquid crystal layer, such as IPS and FFS mode liquid crystal displays.

3 Claims, 42 Drawing Sheets

U.S. PATENT DOCUMENTS

2004/0114080 A1     6/2004    Miyachi
2004/0135949 A1     7/2004    Maeda
2006/0292372 A1    12/2006    Paukshto et al.

OTHER PUBLICATIONS

S.H. Lee, S.L. Lee, H. Y. Kim, Electro-optic Characteristics and Switching Principle of a Nematic Liquid Crystal Cell Controlled by Fringe-Field Switching, Appl. Phys. Lett., 1998, pp. 2881-2883, vol. 73.

J. Chen, K.H. Kim, J.J. Jyu, J.H. Souk, Optimum Film Compensation Modes for TN and VA LCD's, SID '98 Digest, 1998, pp. 315-318.

Y. Saitoh, S. Kimura, K. Kusafuka, H. Shimizu, Optimum Film Compensation of Viewing Angle of Contrast in In-Plane-Switching-Mode Liquid Crystal Display, Jpn. J. Appl. Phys. Part 1, 1998, pp. 4822-4828, vol. 37.

T. Ishinabe, T. Miyashita, T. Uchida, A Wide Viewing Angle Polarizer and a Quarter-Wave Plate with a Wide Wavelength Range for Extremely High Quality LCDs, IDW01, 2001, pp. 485-488.

T. Ishinabe, T. Miyashita, T. Uchida, Wide-Viewing-Angle Polarizer with a Large Wavelength Range, Jpn. J. Appl. Phys. Part 1, 2002, pp. 4553-4558, vol. 41.

\* cited by examiner

MULTI-FILM COMPENSATED LIQUID CRYSTAL DISPLAY WITH INITIAL HOMOGENEOUS ALIGNMENT

This is a Divisional of application Ser. No. 10/979,482 filed Nov. 2, 2004 now U.S. Pat. No. 7,450,204.

FIELD OF THE INVENTION

This invention relates to wide viewing angle liquid crystal displays and methods of increasing the viewing angles of liquid crystal displays with multi-film compensation.

BACKGROUND AND PRIOR ART

Liquid crystal displays (LCDs) are widely used in information displays. Due to the intrinsic optical anisotropy of liquid crystal materials, the incident light "sees" different effective birefringence when viewed from different directions. For this reason, the viewing angle of conventional LCDs is not as wide as the viewing angle for self-luminescence displays, such as the cathode-ray tube (CRT), organic light-emitting diode and the plasma display panel. In an effort to widen the viewing angle, several display modes have been disclosed using a lateral electric field to activate the liquid crystal (LC) molecules. In-plane switching (IPS) mode is disclosed in M. Oh-e, et al., "Principles and characteristics of electro-optical behavior with in-plane switching mode", Asia Display, 95, pp. 577-580 (1995) and U.S. Pat. No. 5,600,464, issued to Oh-e in 1997, and fringe field switching mode (FFS) is disclosed in S. H. Lee et al., "Electro-optic characteristics and switching principles of a nematic liquid crystal cell controlled by fringe-field switching", Appl. Phys. Lett., Vol. 73, pp 2881-2883 (1998) and U.S. Pat. No. 5,886,762, issued to Lee in 1999.

In both IPS and FFS modes, the LC molecules at voltage-off state are basically homogeneously aligned on glass or plastic substrates that are coated with a thin indium-tin-oxide (ITO) layer and then overcoated with a polyimide alignment layer. The surfaces of polyimide layers are rubbed in parallel or anti-parallel directions to create a homogeneous alignment. The display panel is sandwiched between two crossed polarizers, and the long axis of LC molecules is either parallel or perpendicular to the transmission direction of their adjacent polarizers at off-state. At on-state, the lateral electric field generated from the comb-shaped electrodes cause the molecules to twist within the plane parallel to the supporting substrates. Therefore, from the opposite direction of the display panel, the incident light experiences almost the same birefringence and a relatively wide and symmetric angle is achieved.

However, the two orthogonally crossed polarizers are no longer perpendicular to each other when viewed from the oblique off-axis direction, especially from the bisector of the crossed polarizers. FIGS. 1A and 1B are schematic diagrams of the crossed polarizers under normal view and under an oblique view from polar angle $\theta$ at the bisector of the crossed polarizers, respectively, where the solid line 11 represents the absorption direction of the top polarizer and the dashed line 12 represents the absorption direction of the bottom polarizer. As shown in FIG. 1B, the absorption axes of these two crossed polarizers make an angle of $2 \tan^{-1}(\cos \theta)$, depending on the viewing polar angle $\theta$. As the viewing polar angle $\theta$ increases, the angle between the two crossed polarizers deviates further from 90°. As a result, light leakage increases as the polar angle increases. For example, FIG. 2 illustrates the typical view of crossed polarizers, wherein the numbers in the contour polar plot represent the transmittance of the incidence light and the wavelength is approximately 550 nm. At azimuthal angles of 45°, 135°, 225° and 315° in FIG. 2, the light leakage is prominent when the polar angle increases approximately 70°. In FIGS. 3A through 3C, the viewing angle characteristics for a conventional IPS mode LCD are illustrated wherein the LC rubbing direction is along the horizontal (0°) axis and the pretilt angle is 1°. The figures illustrate that due to the light leakage at the voltage-off state, the 10:1 contrast ratio contour is limited to a 70° polar angle at azimuthal angles of 45°, 135°, 225° and 315°.

Compensation methods have been disclosed for solving the light leakage problem associated with crossed polarizers. In Chen et al., "Optimum film compensation modes for TN and VA LCDs", SID 1998 Digest, pp 315-318 (1998) and J. E. Anderson and P. J. Bos, "Methods and concerns of compensating in-plane switching liquid crystal displays", Jpn. J. Appl. Phys., Vol. 39, pp 6388-6392 (2000), a method is disclosed for using a positive birefringence C-film ($n_x=n_y<n_z$) plus a positive birefringence A-film ($n_x>n_y=n_z$), where the z-axis is along the film surface normal direction, i.e. the film thickness direction and x axis is parallel to the optical axis direction. An alternative method using a single biaxial film ($n_x>n_y>n_z$) to compensate for the light leakage of crossed polarizers is disclosed in Y. Saitoh et al., "Optimum film compensation of viewing angle of contract in in-plane-switching-mode liquid crystal display", Jpn. J. Appl. Phys. Part 1, Vol. 37, pp 4822-4828 (1998). In addition, a design using two biaxial films to compensate light leakage in a large wavelength range is disclosed in T. Ishinable et al., "A wide viewing angle polarizer and a quarter-wave plate with a wide wavelength range for extremely high quality LCDs", IDW'01, pp 485-488 (2001) and T. Ishinable et al., "A wide viewing angle polarizer with a large wavelength range", Jpn. Appl. Phys. Part 1, Vol. 41, pp. 4553-4558 (2002). However, the cost associated with a C-film and a biaxial film is much higher than the cost of A-film. Additionally, use of a combination of a C-film and an A-film or a single biaxial film does not achieve the desired symmetric viewing angle.

The present invention advances the art by providing a method and apparatus using a positive uniaxial A-film and a negative uniaxial A-film to compensate the dark state light leakage of the liquid crystal display, in which the liquid crystal molecules are homogeneously aligned at inactive state when no voltage is applied to liquid crystal layer and are driven by a substantially lateral electric field. After compensation, the dark state light leakage is greatly decreased and the contrast ratio at oblique viewing polar angle is greatly enhanced, as a result, more than 100:1 contras ratio is achieved in all viewing angles. During the analysis process of dark state light leakage, the Poincaré sphere presentation is used to illuminate the polarization state change in liquid crystal panel.

SUMMARY

A primary objective of the present invention is to provide a novel liquid crystal display with a wide viewing angle, for use as large screen high definition televisions (HDTV) and computer monitors.

A secondary objective of the present invention is to provide a novel method for decreasing light leakage of crossed polarizers at voltage-off state to obtain a wide viewing angle polarizer.

A third objective of the present invention is to provide a compensation method for liquid crystal displays having a liquid crystal layer that is homogenously aligned at voltage off-state, such as IPS mode and FFS mode liquid crystal displays.

A fourth objective of the present invention is to provide a compensation method to keep the normal view dark state of liquid crystal displays relatively unchanged.

A liquid crystal display that includes a first substrate with alignment film having a first polarizer laminated on an outside surface, wherein the first polarizer faces a light source, a second substrate with alignment film having a second polarizer laminated on an outside surface, wherein the second polarizer faces an observer, a liquid crystal layer sandwiched between the first substrate and the second substrate, a positive birefringence uniaxial A-film with its optical axis parallel to the positive birefringence uniaxial A-film surface plane, and a negative birefringence uniaxial A-film with its optical axis parallel to the negative birefringence uniaxial A-film surface plane, wherein the negative birefringence uniaxial A-film is adjacent to the positive birefringence uniaxial A-film, wherein the positive birefringence uniaxial A-film and the negative birefringence uniaxial A-film are located between the first polarizer and the second polarizer, and wherein the optical axis of the positive birefringence uniaxial A-film is approximately perpendicular to the optical axis of the negative birefringence uniaxial A-film.

The angle between an absorption axis of the first polarizer and an absorption axis of the second polarizer is in a range between approximately 85° and approximately 95°, and preferably in the range of between approximately 88° and approximately 92°.

The angle between an absorption axis of the first polarizer and an alignment direction of the liquid crystal layer is in a range between approximately −5° and approximately +5°, and preferably in the range between approximately −2° and approximately +2°.

The angle between an absorption axis of the second polarizer and an alignment direction of the liquid crystal layer is in a range between approximately −5° and approximately +5°, and preferably in the range between approximately −2° and approximately +2°.

The angle between the optical axis of the positive birefringence uniaxial A-film and the absorption axis of the first polarizer is in a range between approximately 85° and approximately 95°, and preferably in the range between approximately 88° and approximately 92°.

The angle between the optical axis of the positive birefringence uniaxial A-film and the absorption axis of the second polarizer is in a range between approximately 85° and approximately 95°, and preferably in the range between approximately 88° and approximately 92°.

The angle between the optical axis of the negative birefringence uniaxial A-film and the absorption axis of the second polarizer is in a range between approximately 85° and approximately 95°, and preferably in the range between approximately 88° and approximately 92°.

The angle between the optical axis of the negative birefringence uniaxial A-film and the absorption axis of the first polarizer is in a range between approximately 85° and approximately 95°, and preferably in the range between approximately 88° and approximately 92°.

The positive birefringence uniaxial A-film and the negative birefringence uniaxial A-film can be located between the liquid crystal layer and the first polarizer.

The positive birefringence uniaxial A-film and the negative birefringence uniaxial A-film can be located between the liquid crystal layer and the second polarizer.

The positive birefringence uniaxial A-film has a retardation value $d\Delta n/\lambda$ between approximately 0.05 and approximately 0.25, where $\lambda$ is the wavelength of incident light, d is the thickness of the positive birefringence uniaxial A-film and $\Delta n = n_e - n_o$ is birefringence of the positive birefringence uniaxial A-film.

The negative birefringence uniaxial A-film has a retardation value $d\Delta n/\lambda$ between approximately −0.25 and approximately −0.05, where $\lambda$ is the wavelength of incident light, d is the thickness of the negative birefringence uniaxial A-film and $\Delta n = n_e - n_o$ is birefringence of the negative birefringence uniaxial A-film.

The liquid crystal layer can be substantially homogeneously aligned between the first substrate and the second substrate at voltage-off state and is driven by a substantially lateral electrical field. The liquid crystal display can be an in-plane switching mode liquid crystal display. The liquid crystal display can be a fringe field switching mode liquid crystal display.

A method for increasing the viewing angle of a liquid crystal display, can include the steps of applying a positive birefringence uniaxial A-film, having its optical axis parallel to the positive birefringence uniaxial A-film surface plane, between a liquid crystal layer and one of a first polarizer and a second polarizer, and applying a negative birefringence uniaxial A-film, having its optical axis parallel to the negative birefringence uniaxial A-film surface plane, adjacent to the positive birefringence uniaxial A-film.

The method can further include integrating the positive birefringence uniaxial A-film and the negative birefringence uniaxial A-film with a liquid crystal display having a homogenously aligned liquid crystal layer at voltage-off state, wherein the liquid crystal layer is driven by a substantially lateral electrical field.

The method can further include locating the positive birefringence uniaxial A-film, the negative birefringence uniaxial A-film and the liquid crystal layer between two orthogonally crossed polarizers.

Further objects and advantages of the invention will be apparent from the following preferred embodiments which are illustrated schematically in the accompanying drawings.

DESCRIPTION OF THE PREFERRED EMBODIMENTS

Before explaining the disclosed embodiment of the present invention in detail it is to be understood that the invention is not limited in its applications to the details of the particular arrangement shown since the invention is capable of other embodiments. Also, the terminology used herein is for the purpose of description and not of limitation.

Many LCDs use orthogonally crossed polarizers because they achieve a good dark state from a normal viewing angle. The conventional polarizer used for LCDs are produced by stretching a polymeric film, such as polyvinyl alcohol (PVA) doped with iodine or organic dye. The optical property of a polarizer is equivalent to a uniaxial absorption film with its absorption axis parallel to the optical axis of the polarizer and its transmission direction perpendicular to the optical axis of the polarizer; therefore, the absorption direction and the transmission direction of a polarizer is perpendicular with each other.

Figure 4A:
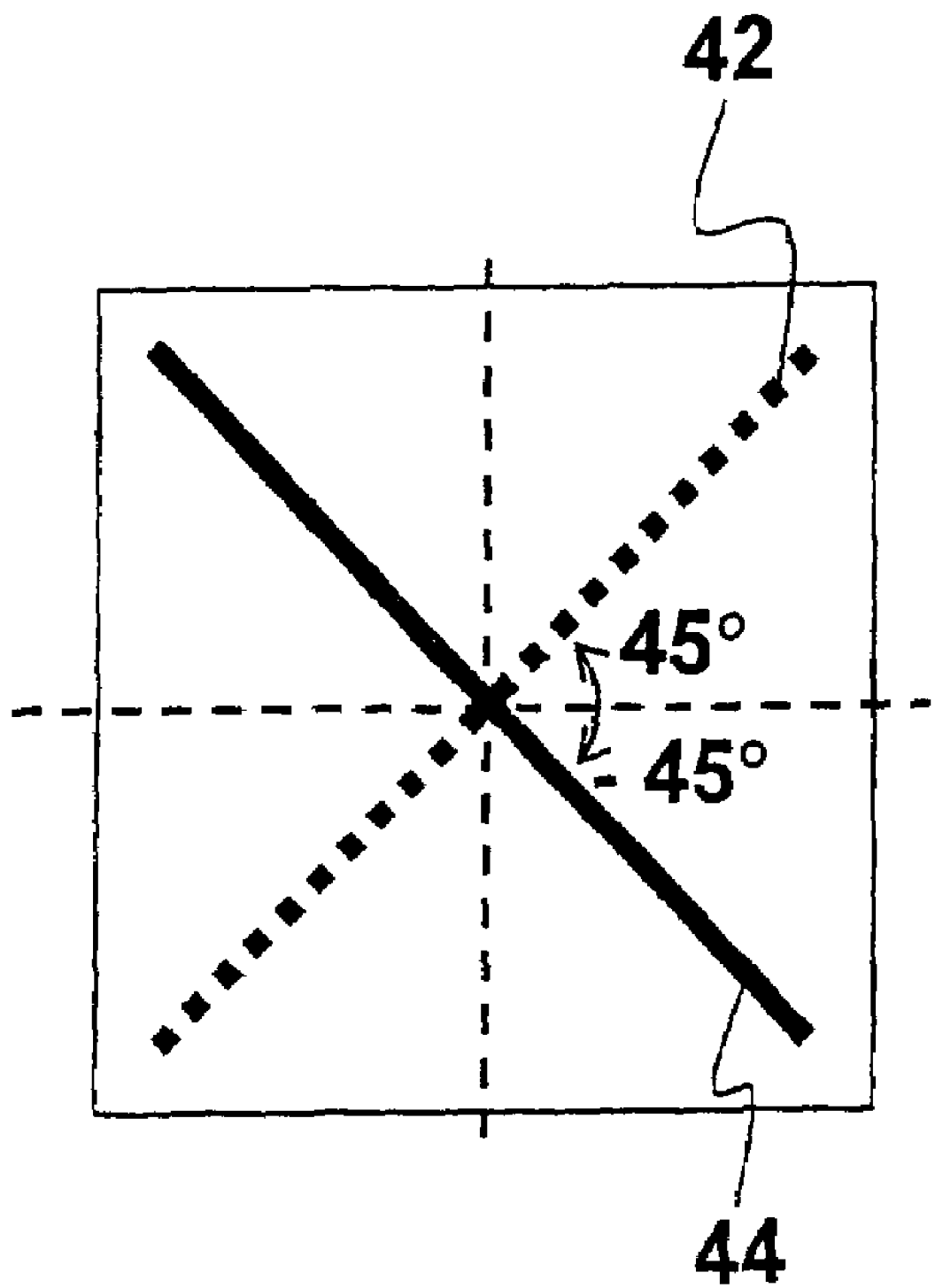
FIG. 4A is a representation of two orthogonally crossed polarizers under normal view.
Figure 4B:
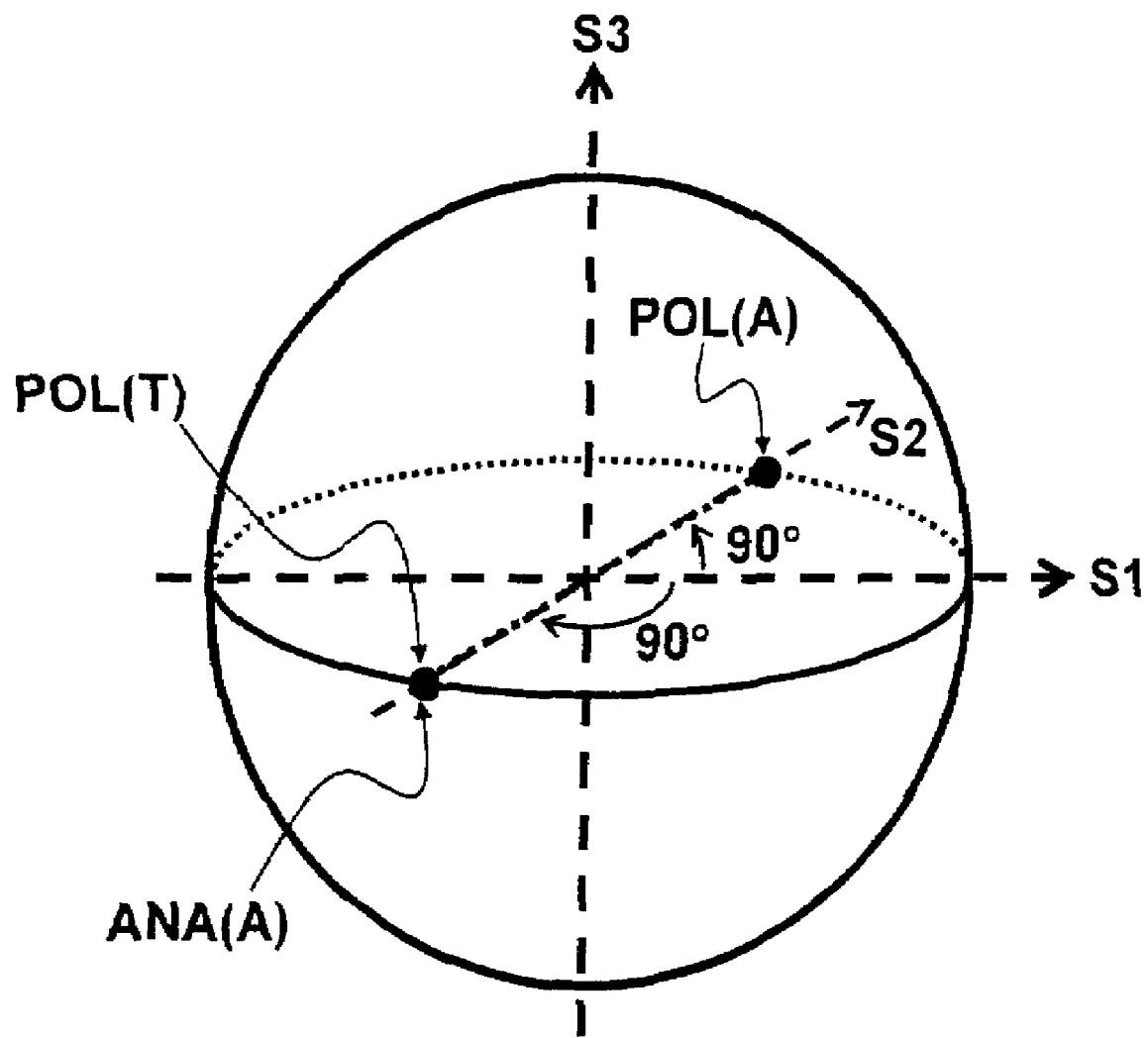
FIG. 4B illustrates a Poincaré sphere representation of the two orthogonally crossed polarizers of FIG. 4A.

Under normal viewing, the absorption axes (directions) of orthogonally crossed polarizers are perpendicular to each other, as illustrated in FIG. 4A where the dashed line 42 represents the absorption direction of the bottom polarizer and the solid line 44 represents the absorption direction of the top polarizer. On the Poincaré sphere illustrated in FIG. 4B, the point identified as POL(T) is the transmission direction of the bottom polarizer and point POL(A) is the absorption axis of the bottom polarizer and point ANA(A) is the absorption axis of the top polarizer. Under normal view, the transmission direction POL(T) of the bottom polarizer and the absorption direction ANA(A) of the top polarizer are exactly overlapped. Therefore, no light leaks out and a very good dark state is achieved.

Figure 5A:
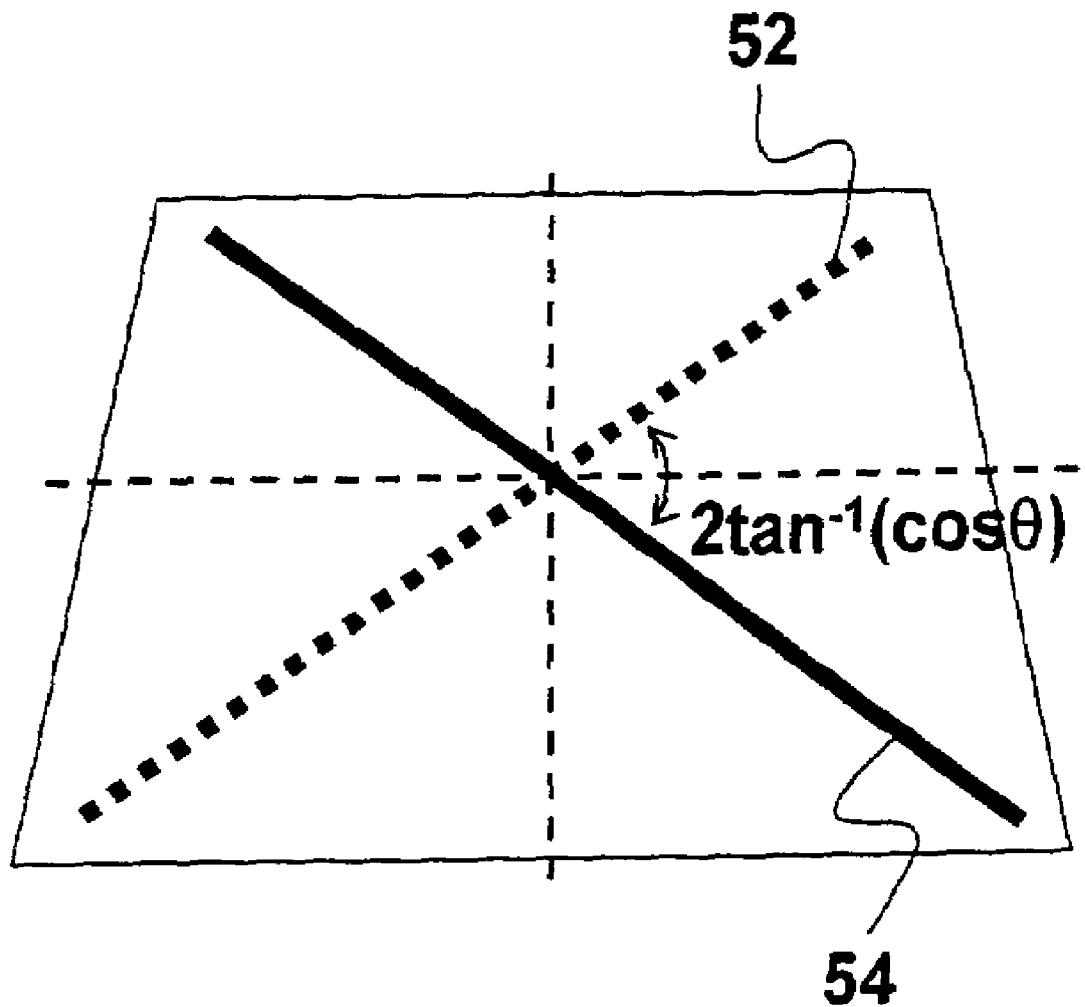
FIG. 5A illustrates two orthogonally crossed polarizers under oblique view.
Figure 5B:
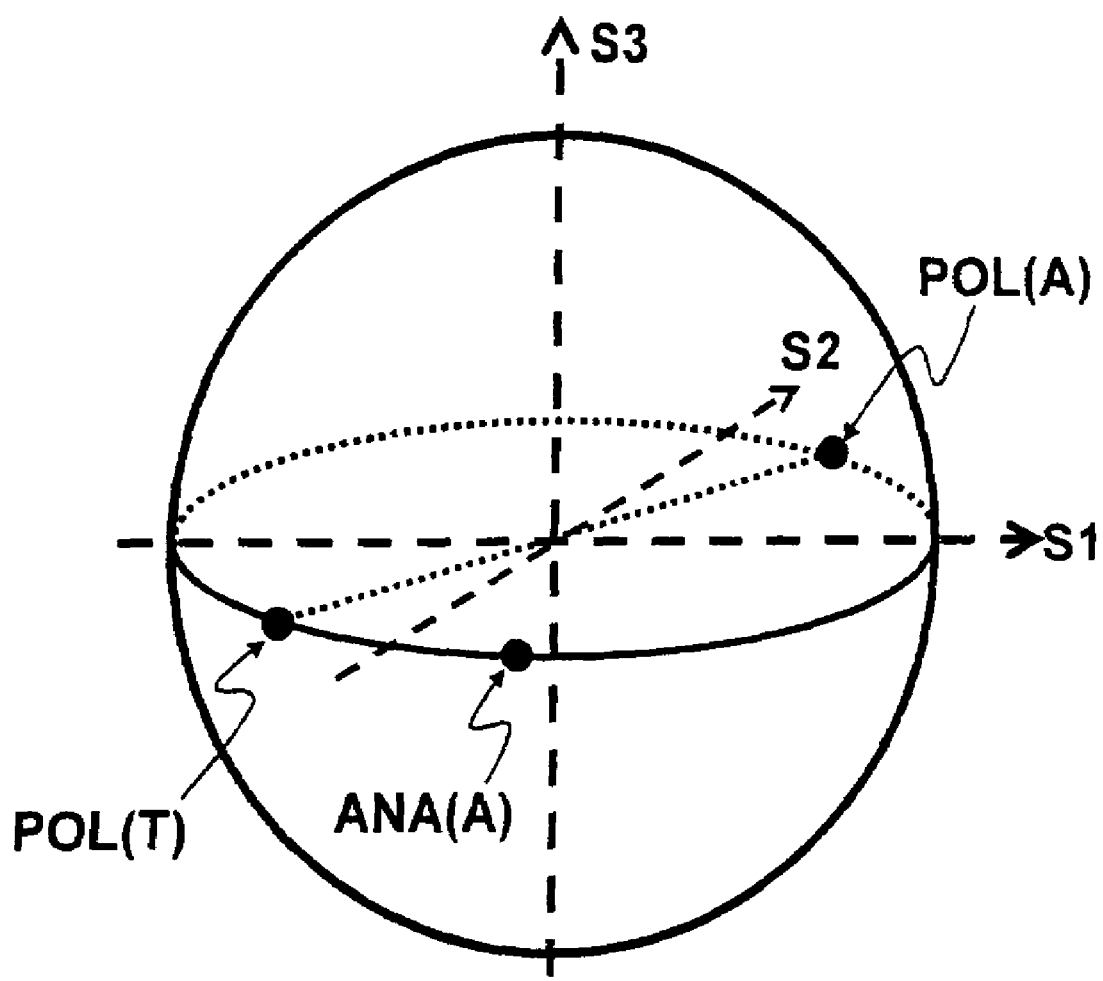
FIG. 5B illustrates a Poincaré sphere representation of the two orthogonally crossed polarizers of FIG. 5A.

However, under oblique view from the off-axis direction, the absorption axis 52 of the bottom polarizer and absorption axis 54 of the top polarizer are not perpendicular, especially from the oblique direction of the bisector of the crossed polarizers as shown in the schematic view of FIG. 5A. On the Poincaré sphere in FIG. 5B, it is shown that the transmission direction of the bottom polarizer (point POL(T)) and the absorption direction of the top polarizer (point ANA(A)) are separated from each other.

Figure 1A:
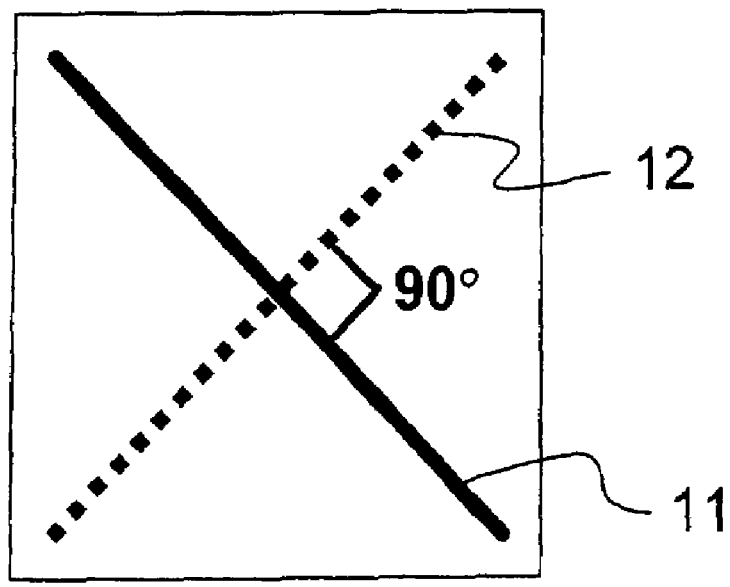
FIG. 1A is a schematic view of two crossed polarizers from a normal viewing direction.
Figure 1B:
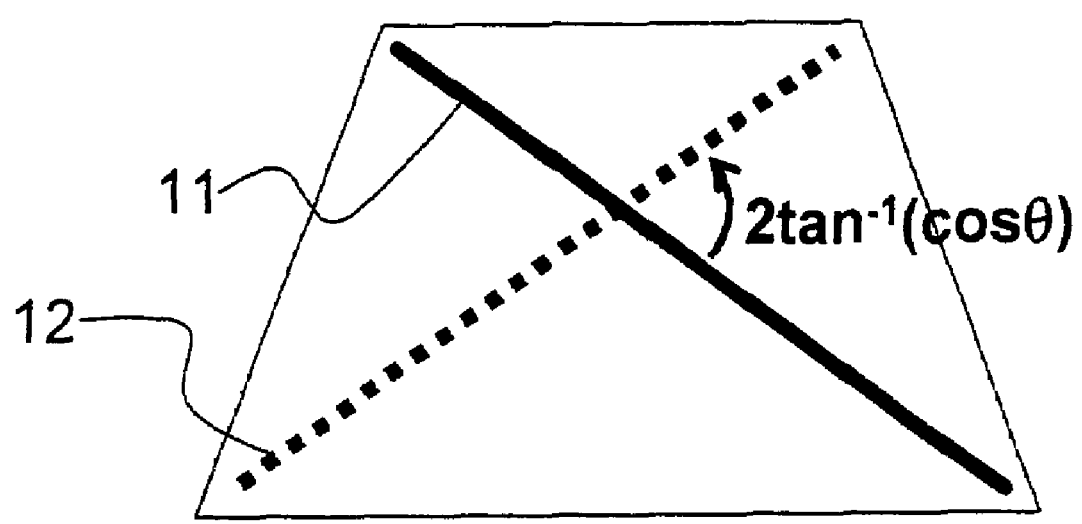
FIG. 1B is a schematic view of two crossed polarizers from an oblique viewing polar angle θ at the bisector of the crossed polarizers.
Figure 2:
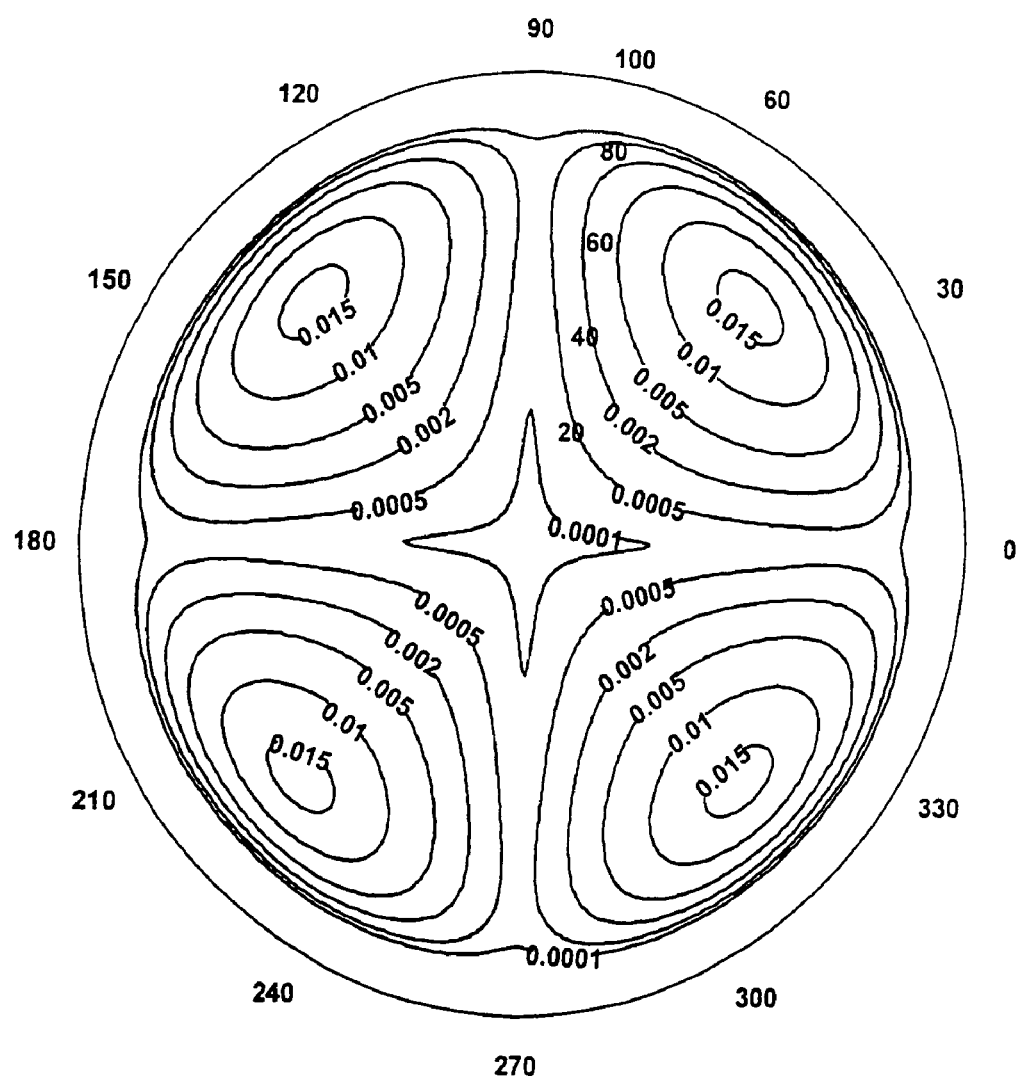
FIG. 2 is a graphical representation of the typical field of view of two orthogonally crossed polarizers.
Figure 3A:
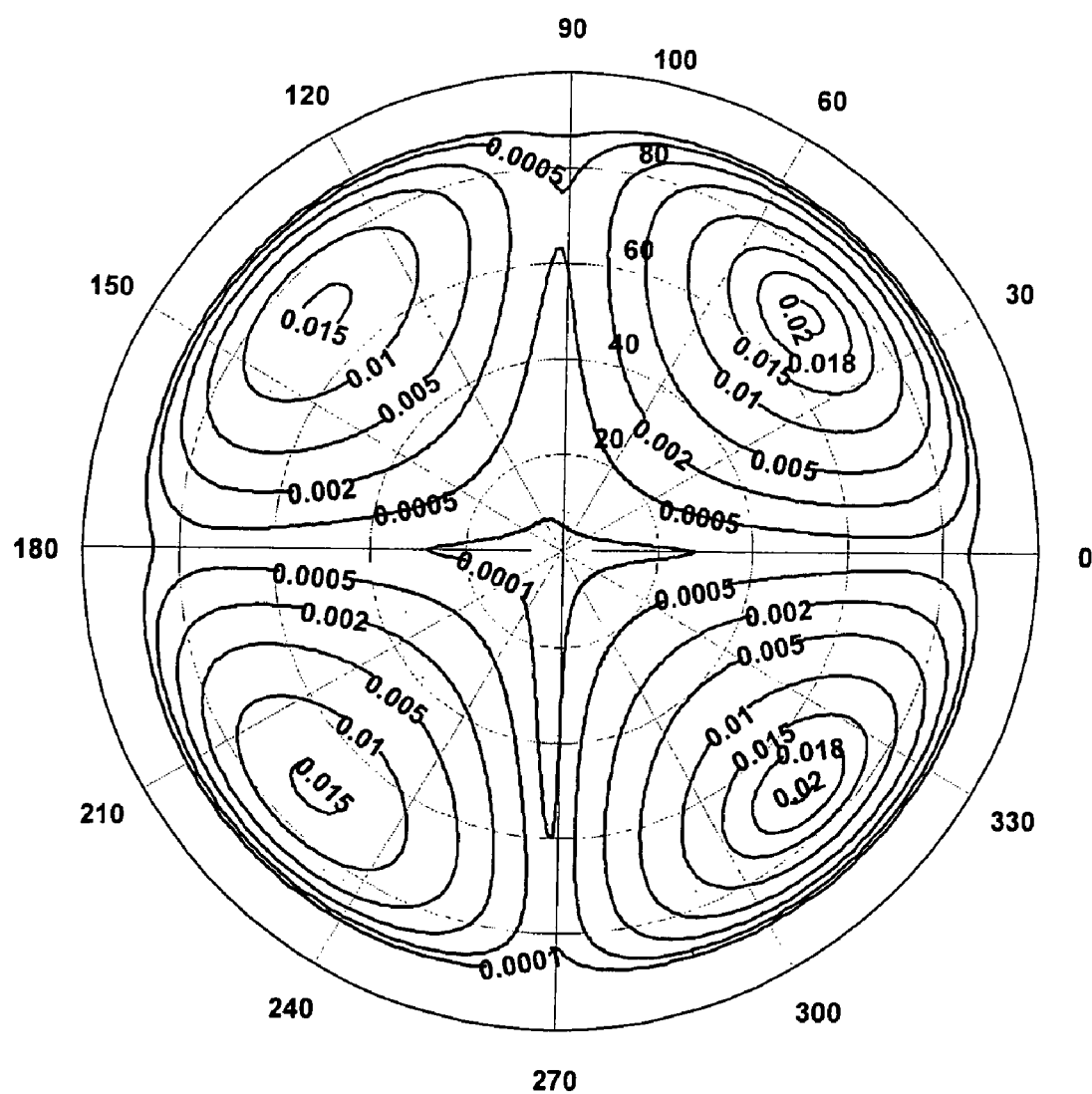
FIG. 3A is a graphical representation of typical viewing angle characteristics of a conventional IPS mode LCD at voltage-off state.
Figure 3B:
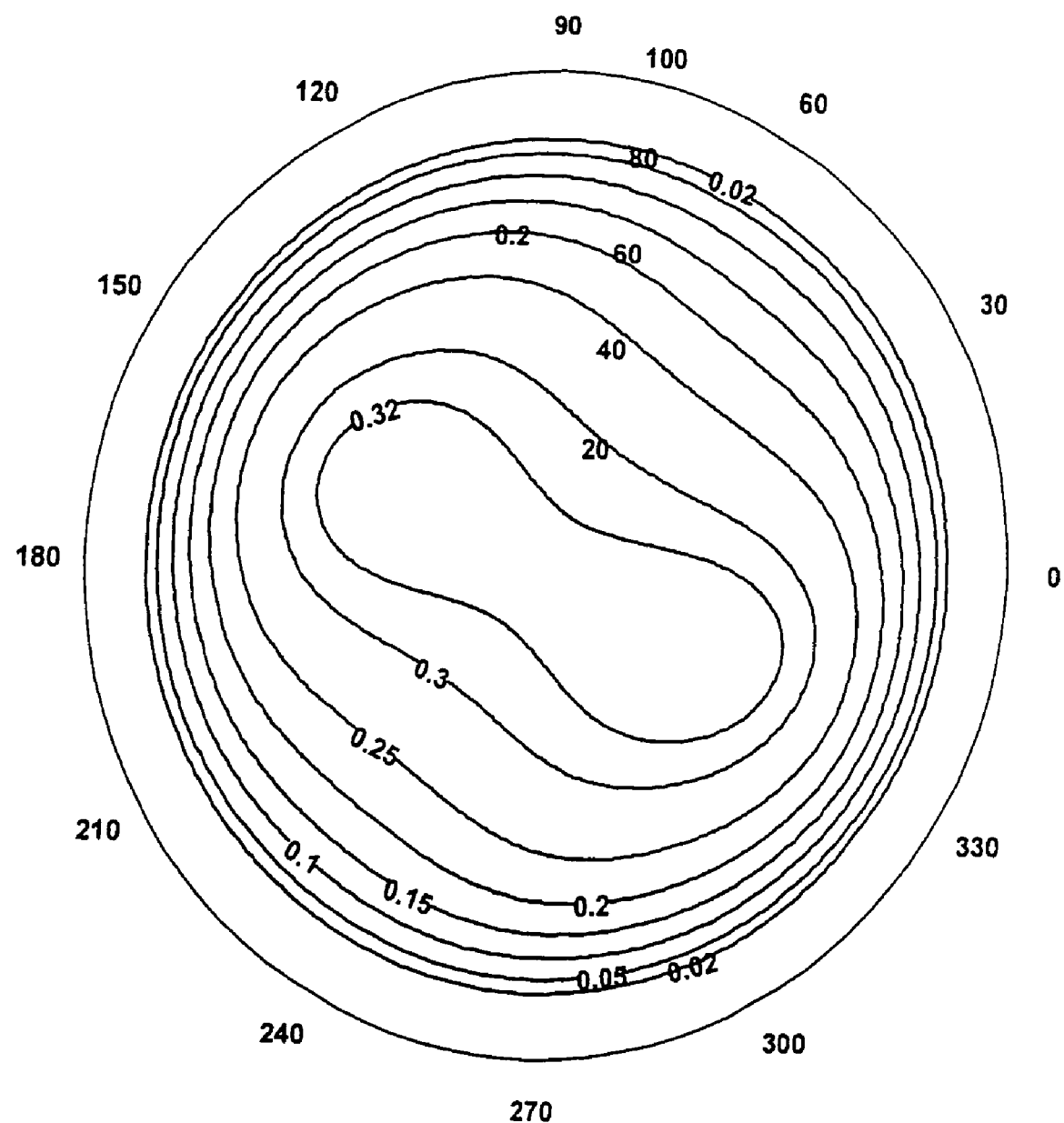
FIG. 3B is a graphical representation of typical viewing angle characteristics of a conventional IPS mode LCD at voltage-on state.
Figure 3C:
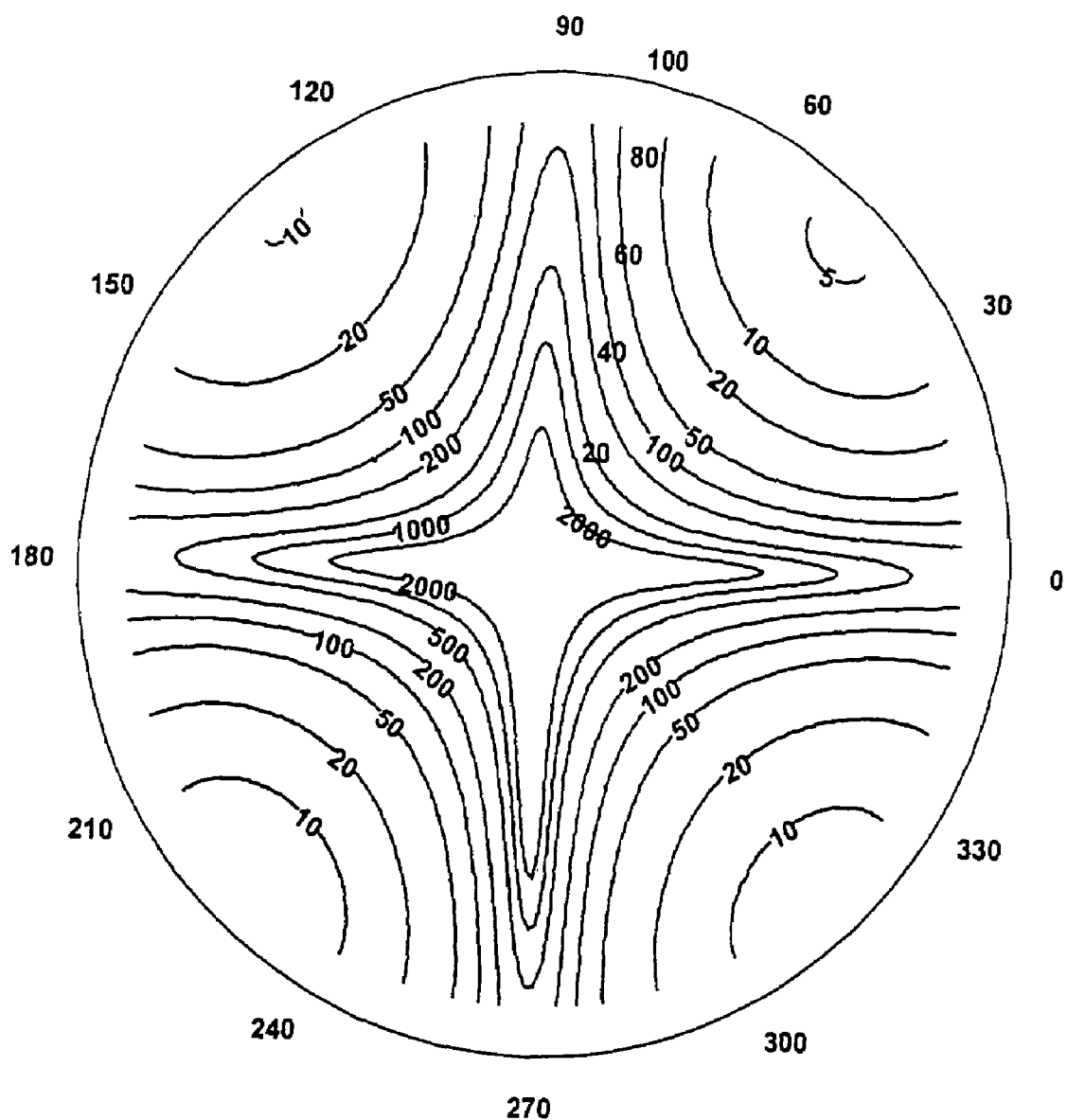
FIG. 3C is a graphical representation of typical iso-contrast ratio viewing angle characteristics of a conventional IPS mode LCD.

As a result, light leakage occurs as previously illustrated in FIG. 2. In LCDs with the liquid crystal layer homogeneously aligned at off-state and driven by a lateral electric field, such as the IPS-mode (in-plane switching mode) and FFS-mode (fringe field switching mode) LCDs, the dark state light leakage results primarily from the crossed polarizer light leakage.

Therefore, reducing or eliminating the light leakage from the crossed polarizers can enhance the viewing angle of the IPS and FFS mode LCDs.

Figure 6A:
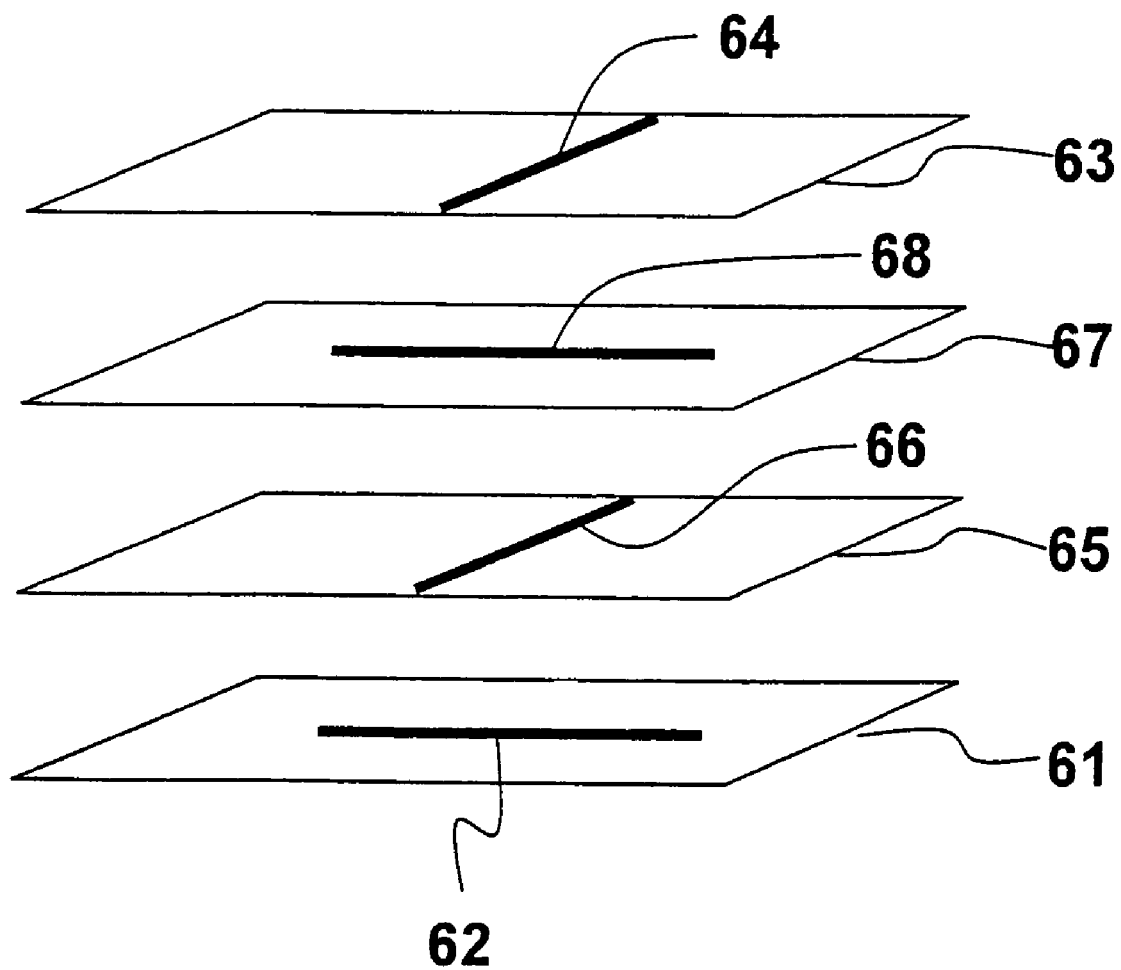
FIG. 6A illustrates the configuration of two orthogonally crossed polarizers with positive A-film and negative A-film compensation in this invention.

FIG. 6A illustrates the configuration of crossed bottom polarizer 61 and top polarizer 63 with a positive A-film 65 and a negative A-film 67 sandwiched between them. The absorption axis 62 of the bottom polarizer 61 is perpendicular to the absorption axis 64 of the top polarizer 63. The positive A-film 65 is a uniaxial birefringence film with its optical axis 66 parallel to its film surface plane and has a birefringence $\Delta n = n_e - n_o > 0$. The angle between the optical axis 66 of the positive A-film 65 and the absorption axis 62 of the bottom polarizer 61 is less than approximately 95° and greater than approximately 85°. In a preferred embodiment, the angle is less than approximately 92° and greater than approximately 88°. The positive A-film 65 has a phase retardation in the range of $0.05 \leq d\Delta n/\lambda \leq 0.25$, where $\lambda$ is the wavelength of incident light, d is the thickness of the positive A-film 65 and $\Delta n = n_e - n_o$ is the birefringence of the positive A-film 65.

The negative A-film 67 is a uniaxial birefringence film with its optical axis 68 parallel to its film surface plane and has a birefringence $\Delta n = n_e - n_o < 0$. The angle between the optical axis 68 of the negative A-film 67 and the absorption axis 64 of the top polarizer 63 is less than approximately 95° and greater than approximately 85°. In a preferred embodiment, the angle is less than approximately 92° and greater than approximately 88°. The negative A-film 67 has a phase retardation in the range of $-0.25 \leq d\Delta n/\lambda \leq -0.05$, where $\lambda$ is the wavelength of incident light, d is the thickness of the negative A-film 67 and $\Delta n = n_e - n_o$ is the birefringence of the negative A-film 67.

Figure 6B:
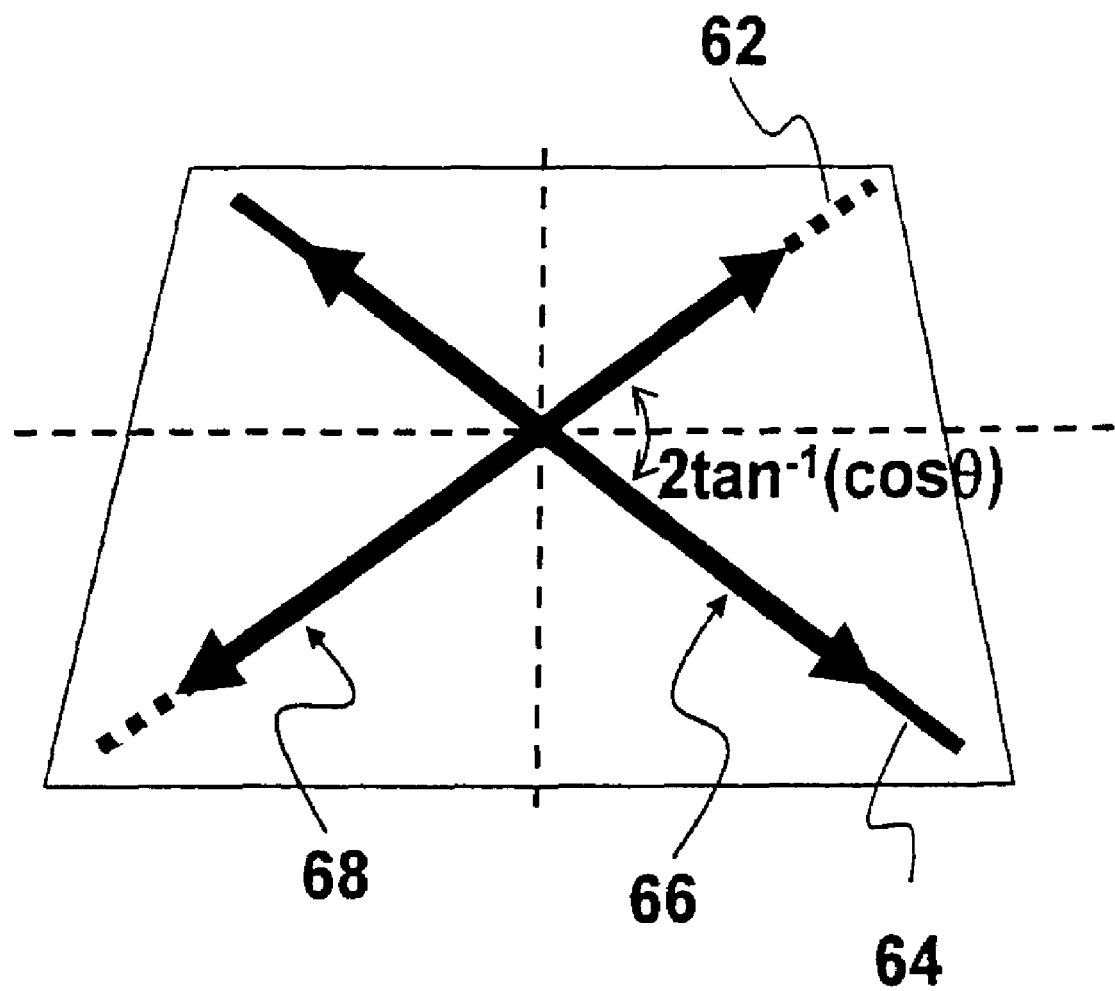
FIG. 6B illustrates the oblique view layout of optical axes of the positive A-film and negative A-film and absorption axes of crossed polarizers of FIG. 6A.

FIG. 6B illustrates the oblique view layout of optical axes of the positive A-film and negative A-film and absorption axes of crossed polarizers in FIG. 6A. Apparently under oblique view, the absorption axis 62 of the bottom polarizer 61 and the absorption axis 64 of the top polarizer 63 are not perpendicular with each other any more. Although not perpendicular under oblique view, the crossed polarizers only generate very little light leakage after the compensation of positive A-film 65 and negative A-film 67.

Figure 6C:
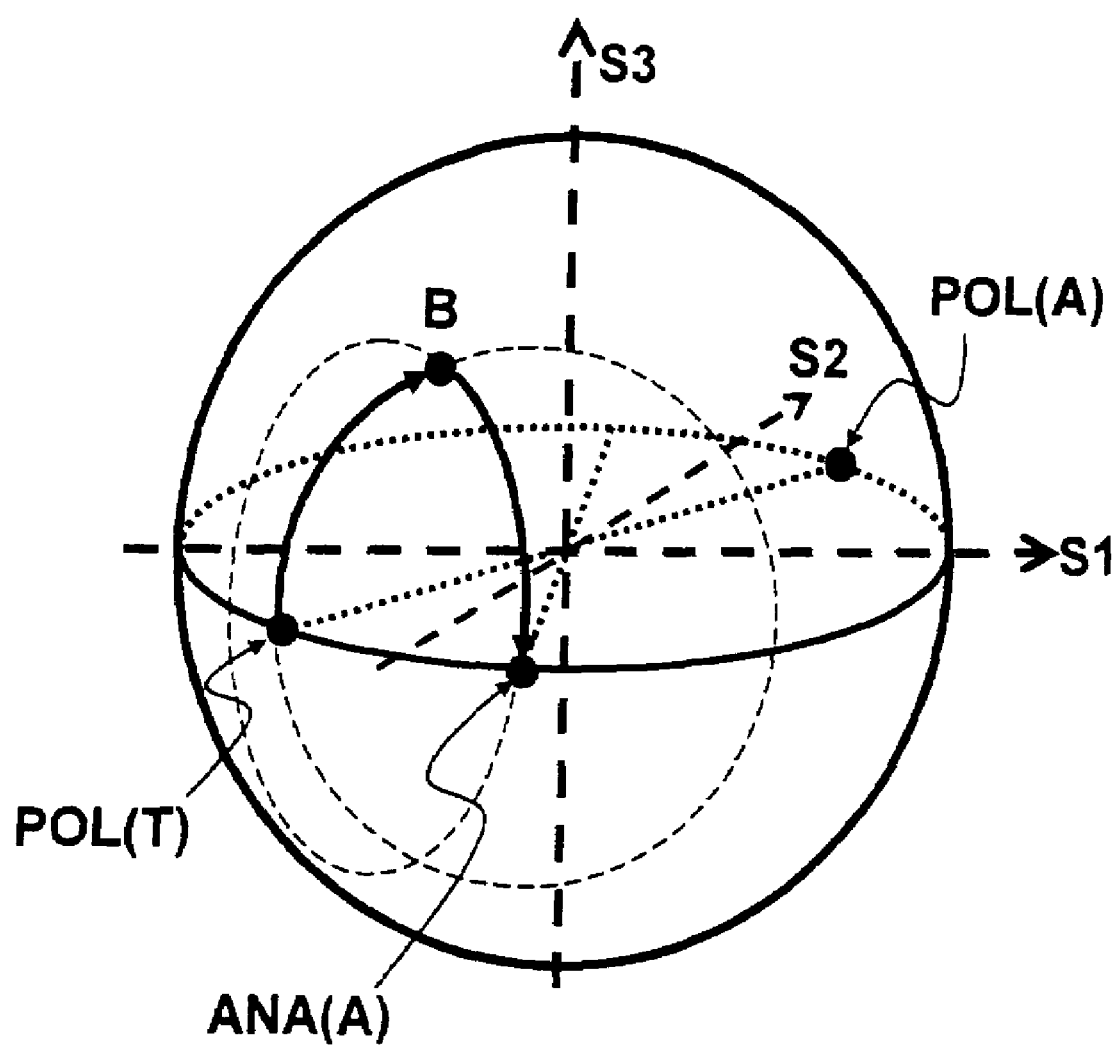
FIG. 6C illustrates a Poincaré sphere representation of the two orthogonally crossed polarizers and compensation films of FIGS. 6A and 6B.

The following is an explanation of the film compensation principle used in the method and apparatus of the present invention. As illustrated in FIG. 6C, as the incident light passes through the bottom polarizer 61, it becomes linearly polarized and is located at point POL(T). After passing through the positive A-film 65, the polarization state moves to point B. After passing through the negative A-film 68, point B moves to point ANA(A). The light is completely absorbed by the top polarizer 63 and no leakage occurs. To keep the normal view and on-axis dark state unchanged, the optical axes of the positive A-film 65 and the negative A-film 67 are approximately perpendicular to the absorption axes of their adjacent polarizers.

Figure 7:
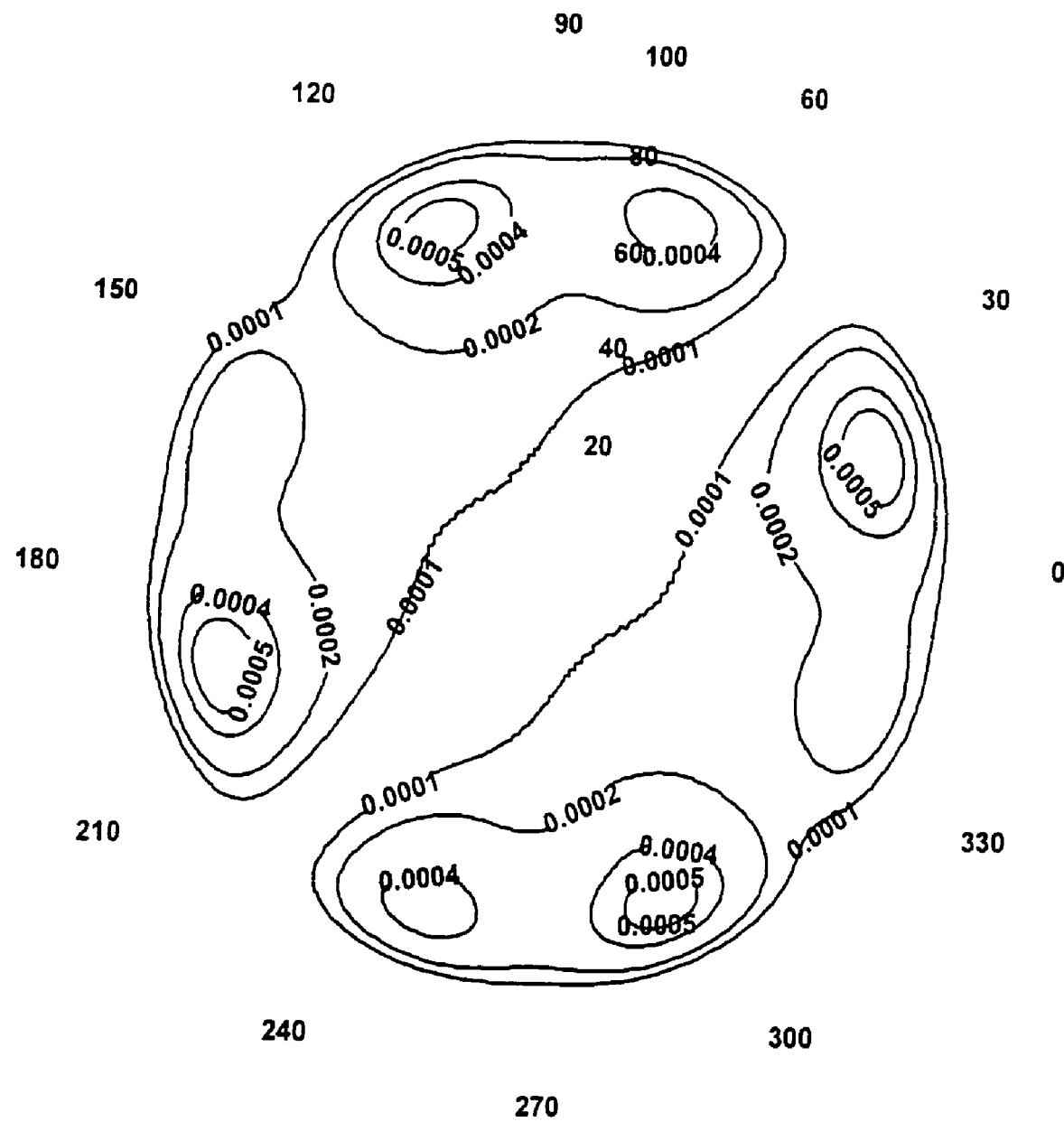
FIG. 7 illustrates the light leakage characteristics of the crossed polarizers with positive A-film and negative A-film compensation according to FIGS. 6A through 6C.

FIG. 7 illustrates the field of view of crossed polarizers with a positive A-film 65 and a negative A-film 67 compensation according to FIGS. 6A through 6C. Comparing FIG. 2 without film compensation to FIG. 7 with film compensation, the largest light leakage decreases approximately 30 times.

Figure 8A:
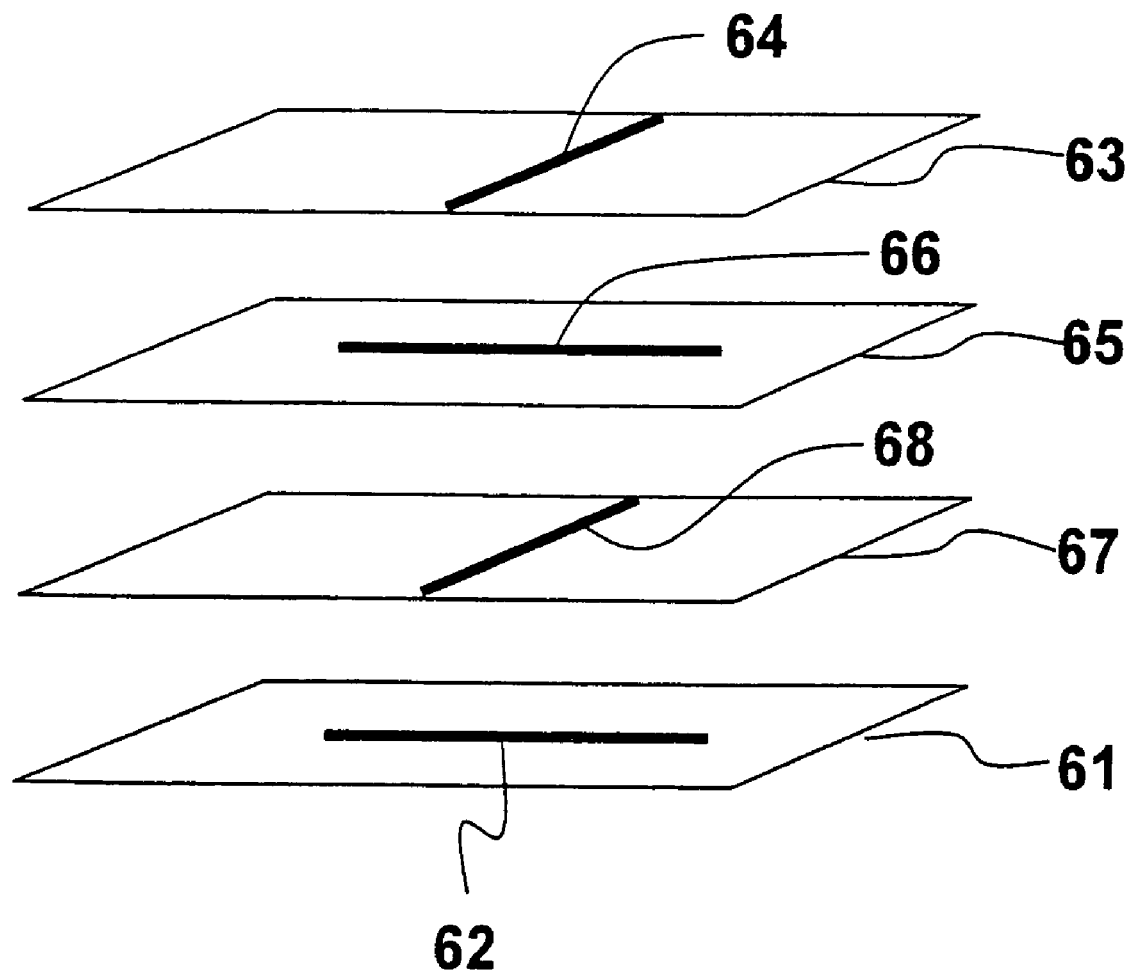
FIG. 8A illustrates the configuration of two orthogonally crossed polarizers with a negative A-film and a positive A-film compensation in this invention.
Figure 8B:
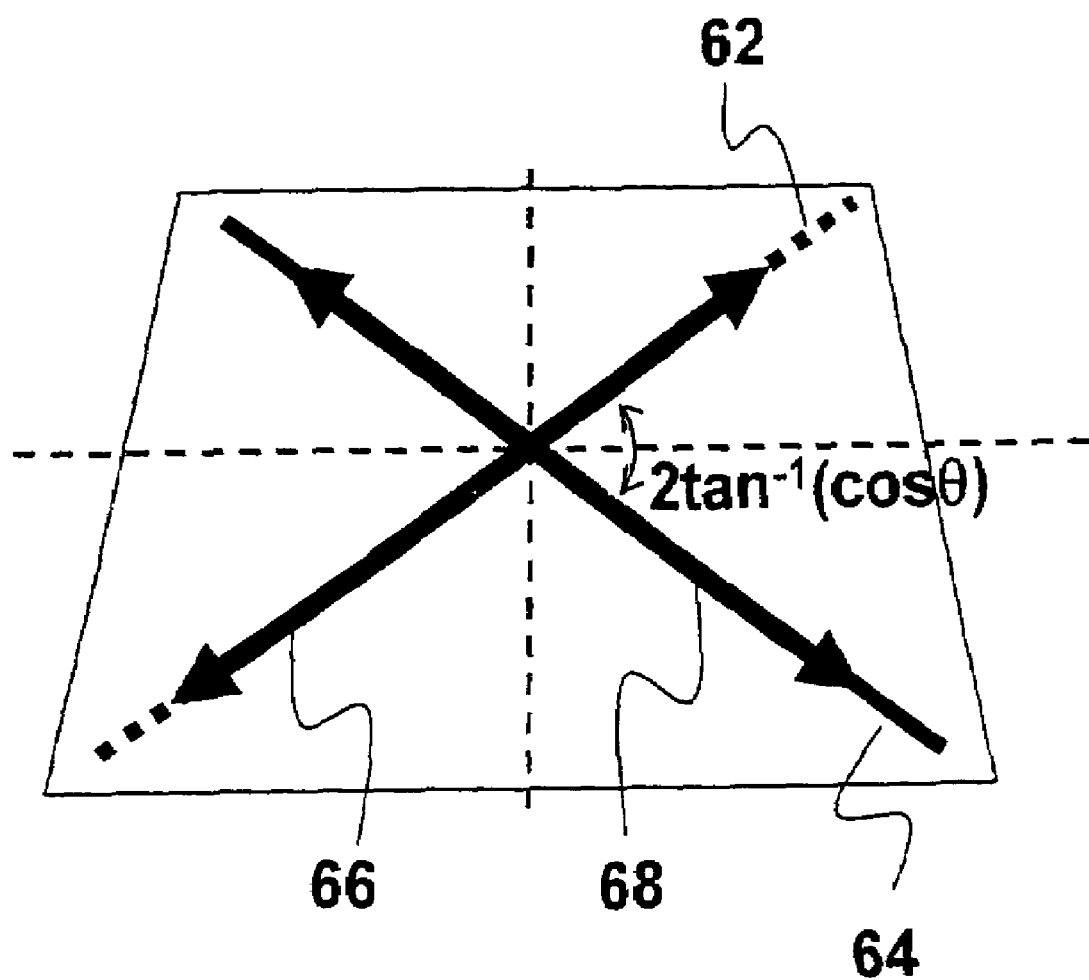
FIG. 8B illustrates the oblique view layout of optical axes of the negative A-film and positive A-film and absorption axes of crossed polarizers of FIG. 8A.
Figure 8C:
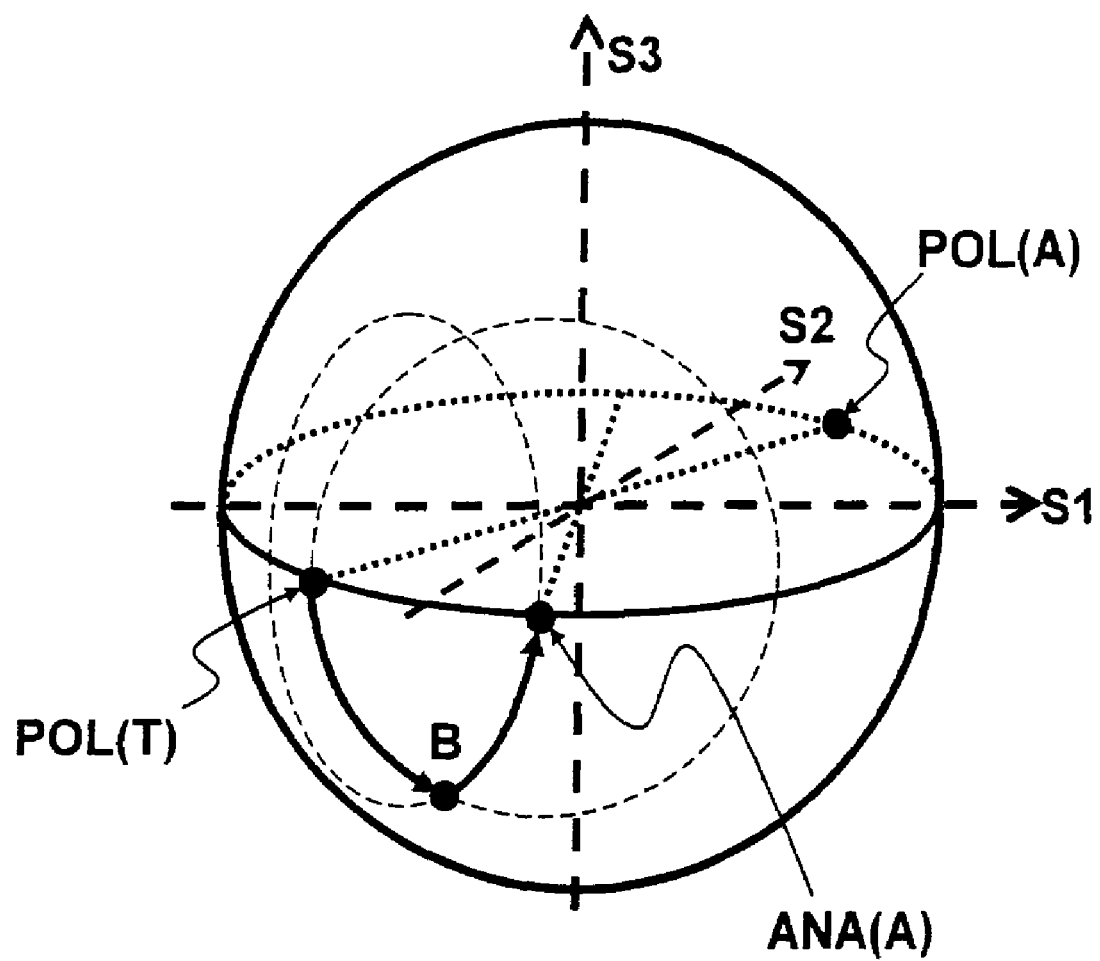
FIG. 8C illustrates a Poincaré sphere representation of the two orthogonally crossed polarizers and compensation films of FIGS. 8A and 8B.
Figure 9:
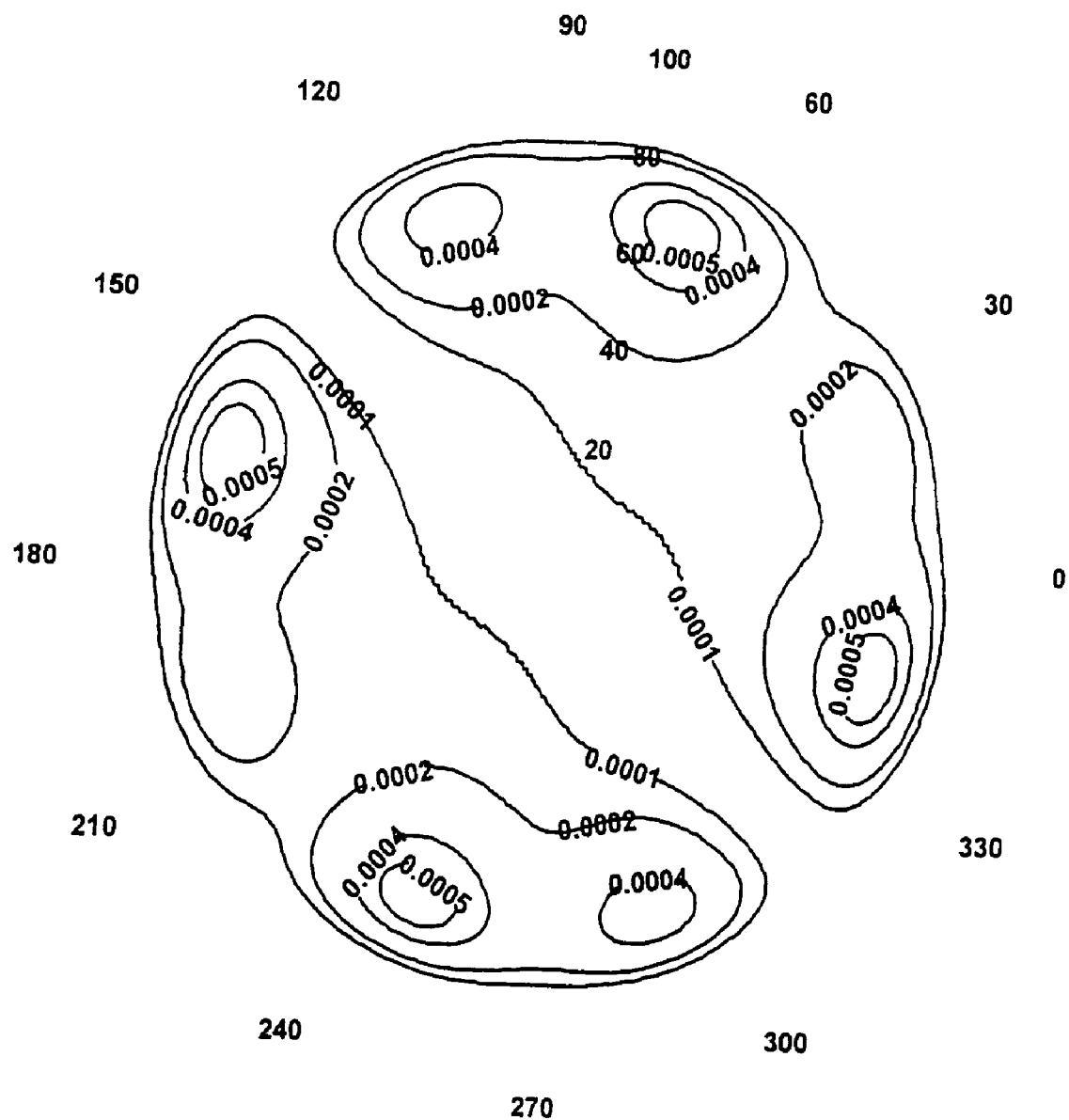
FIG. 9 illustrates the light leakage characteristics of crossed polarizers with a negative A-film and a positive A-film compensation according to FIGS. 8A through 8C.

Alternatively, the positions of the positive A-film and the negative A-film can be exchanged as illustrated in the schematic view of FIGS. 8A and 8B and the Poincaré sphere presentation in FIG. 8C. In FIG. 9, the results of the alternative compensation configuration are illustrated. Comparing FIG. 7 to FIG. 9, it is apparent that the reduction in light leakage is approximately the same.

To extend the compensation method of the present invention to LCDs with liquid crystal layer initially homogenous alignment, such as IPS mode LCD and FFS mode LCD, the alignment direction (rubbing direction) of the liquid crystal layer, the optical axis directions of both positive and negative A-films, the absorption axis directions of both polarizers should be properly set up and the film retardation values of both positive and negative A-films need to be optimized. Table 1 lists the liquid crystal parameters that were used in the following computer simulation.

TABLE 1

| Parameters | Value |
| --- | --- |
| $n_e$ | 1.5621 ($\lambda = 550$ nm) |
| $n_o$ | 1.4771 ($\lambda = 550$ nm) |
| $\epsilon_p$ | 14.7 |
| $\epsilon_v$ | 4.4 |
| $K_{11}$ | $9.2 \times 10^{-12}$ N |
| $K_{22}$ | $6.1 \times 10^{-12}$ N |
| $K_{33}$ | $14.6 \times 10^{-12}$ N |
| Cell gap | 4.0 μm |
| Pretilt angle | 1° |

Figure 10:
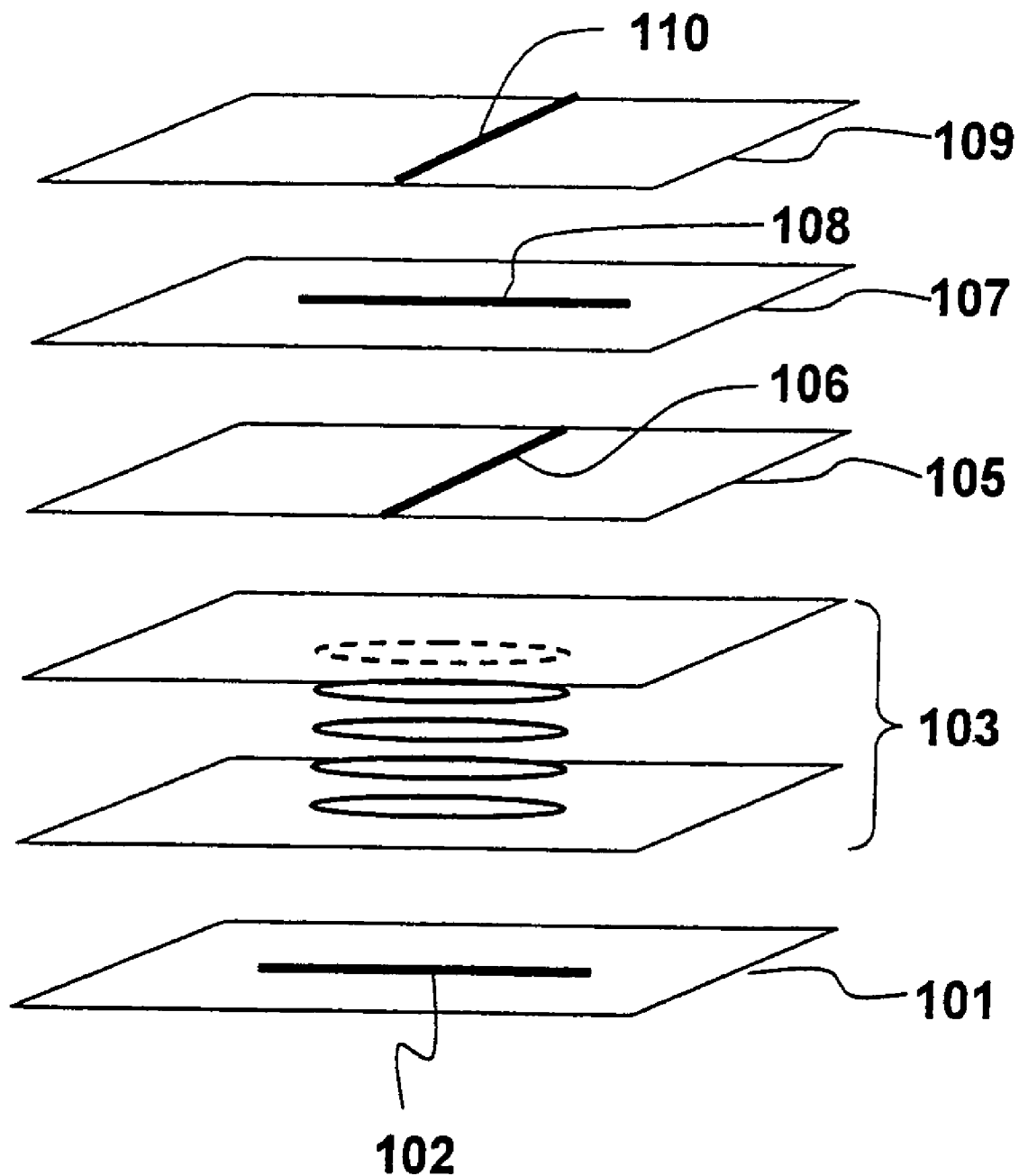
FIG. 10 illustrates a schematic structure of the multi-film compensation IPS (or FFS) mode as described in a first embodiment of the present invention.

In a first embodiment, FIG. 10 illustrates the use of the multi-film compensation method and apparatus with an IPS-mode LCD, comprising a bottom polarizer 101 with a first absorption direction 102 and a top polarizer 109 with a second absorption direction 110 perpendicular to the first absorption direction 102 of the bottom polarizer 101, a homogeneously aligned liquid crystal (LC) layer 103 with its alignment direction parallel to the absorption direction 102 of the bottom polarizer 101, a positive A-film 105 with its optical axis 106 perpendicular to the absorption direction 102 of the bottom polarizer 101, a negative A-film 107 with its optical axis 108 perpendicular to the absorption direction 110 of the top polarizer 109.

The LC layer 103 is substantially homogeneously aligned at off-state when no voltage is applied to the LC layer 103 and forms a twist profile when driven by the lateral electric field generated from the comb-shaped electrodes. While FIG. 10 illustrates the use with an IPS-mode LCD, usage of the novel multi-film compensator is equally applicable to an FFS-mode LCD.

Figure 11:
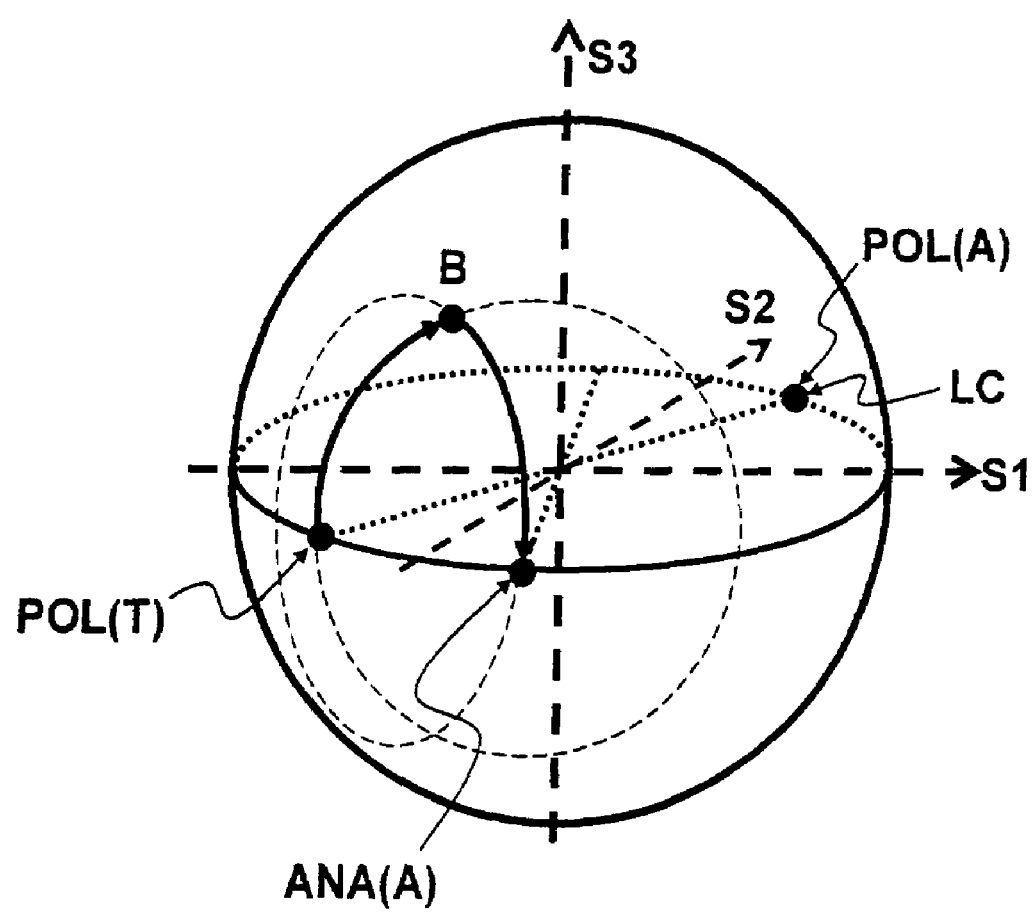
FIG. 11 is a Poincaré sphere representation of an IPS (or FFS) mode LCD with a positive A-film and negative A-film compensation according to a first embodiment.

FIG. 11 is a Poincaré sphere presentation of the compensation principle when a positive A-film and a negative A-film compensation are applied to the IPS (or FFS) mode LCD of FIG. 10. Point POL(T) is the transmission direction of the bottom polarizer 101, POL(A) is the absorption direction 102 of the bottom polarizer 101, ANA(A) is the absorption direction 110 of the top polarizer 109, and the point designated as LC is the liquid crystal alignment direction.

The incident light becomes linearly polarized (point POL (T)) after passing through the bottom polarizer 101. Since the alignment direction of the LC layer 103 is along the absorption direction 102 of the bottom polarizer 101, the linearly polarized light does not change its polarization state after it passes through the LC layer 103. Therefore, the same compensation method used with the pure crossed polarizers can be used with the IPS-mode and FFS-mode LCDs. When the linearly polarized light then passes through the positive A-film 105, point POL(T) moves to point B. After the light passes through the negative A-film 107, point B moves to point ANA(A), which is the absorption direction of the top polarizer 109. Therefore, the light is totally absorbed by the top polarizer 109 and very little light leakage occurs at other oblique angles. Table 2 provides a sample list of the optimized film parameters for the positive A-film and the negative A-film.

Figure 12A:
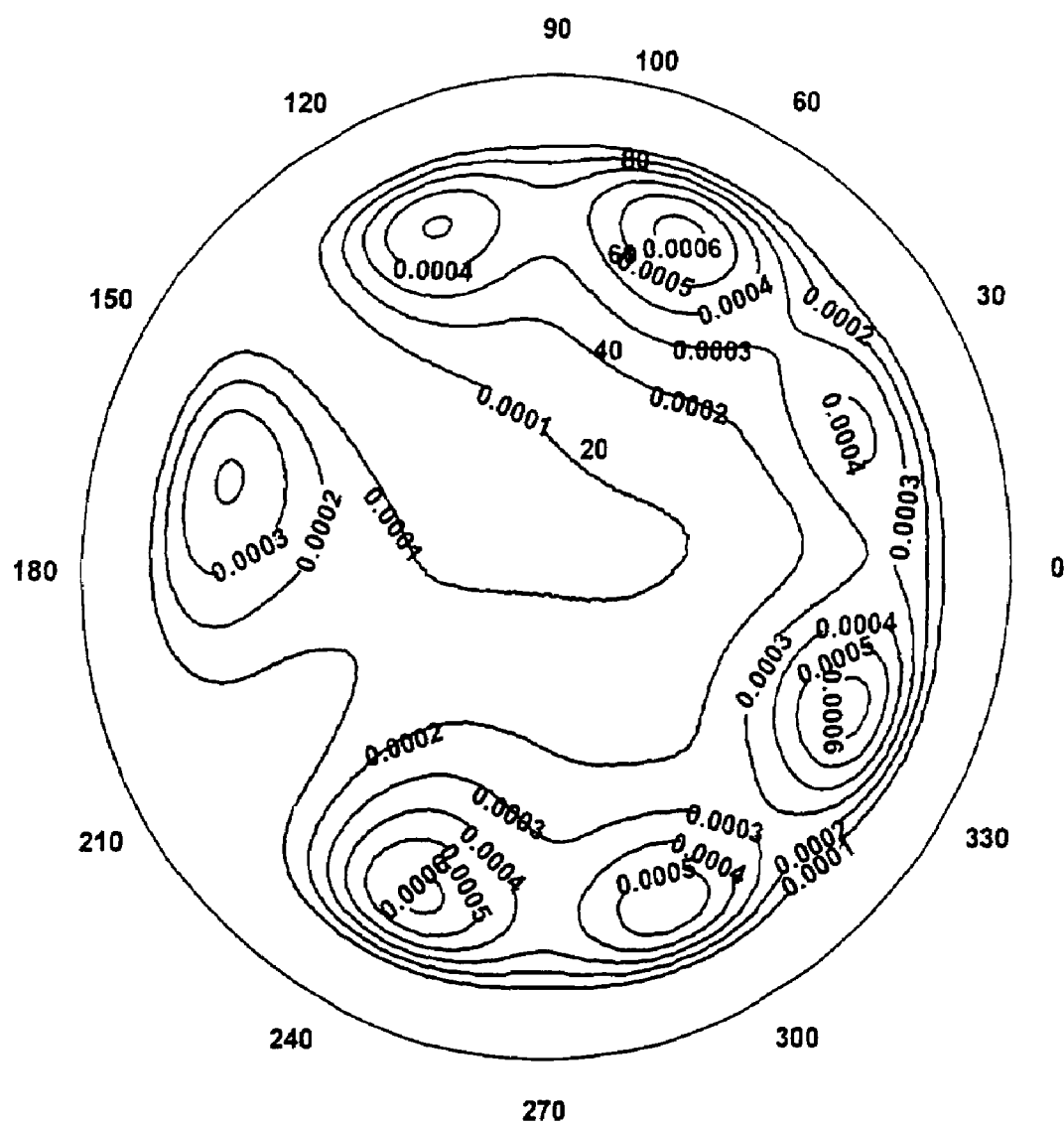
FIGS. 12A and 12B illustrate a field of view of the multi-film compensated IPS mode LCD of embodiment 1 at voltage-off state and at voltage-on state, respectively.
Figure 12B:
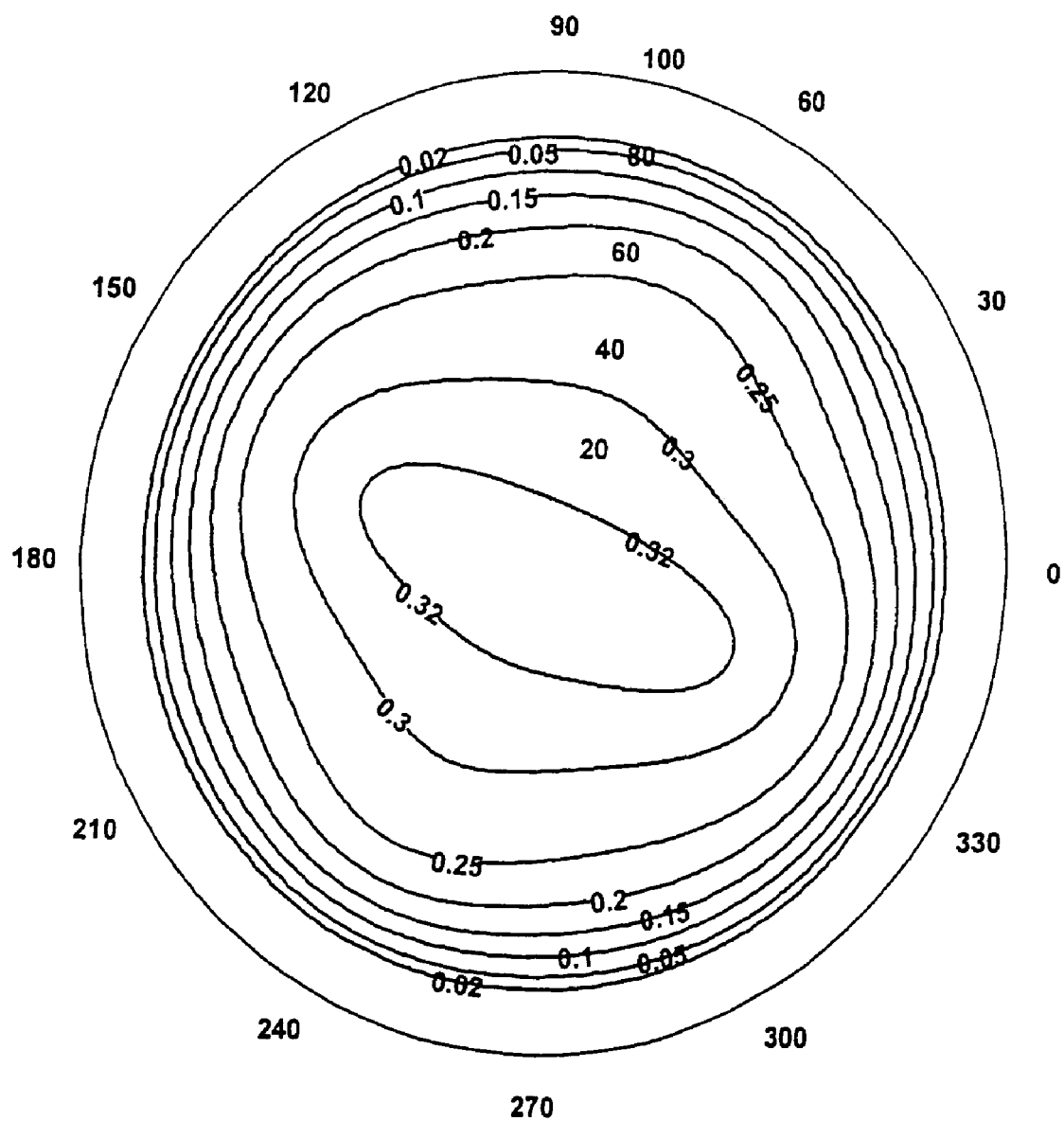
Figure 12C:
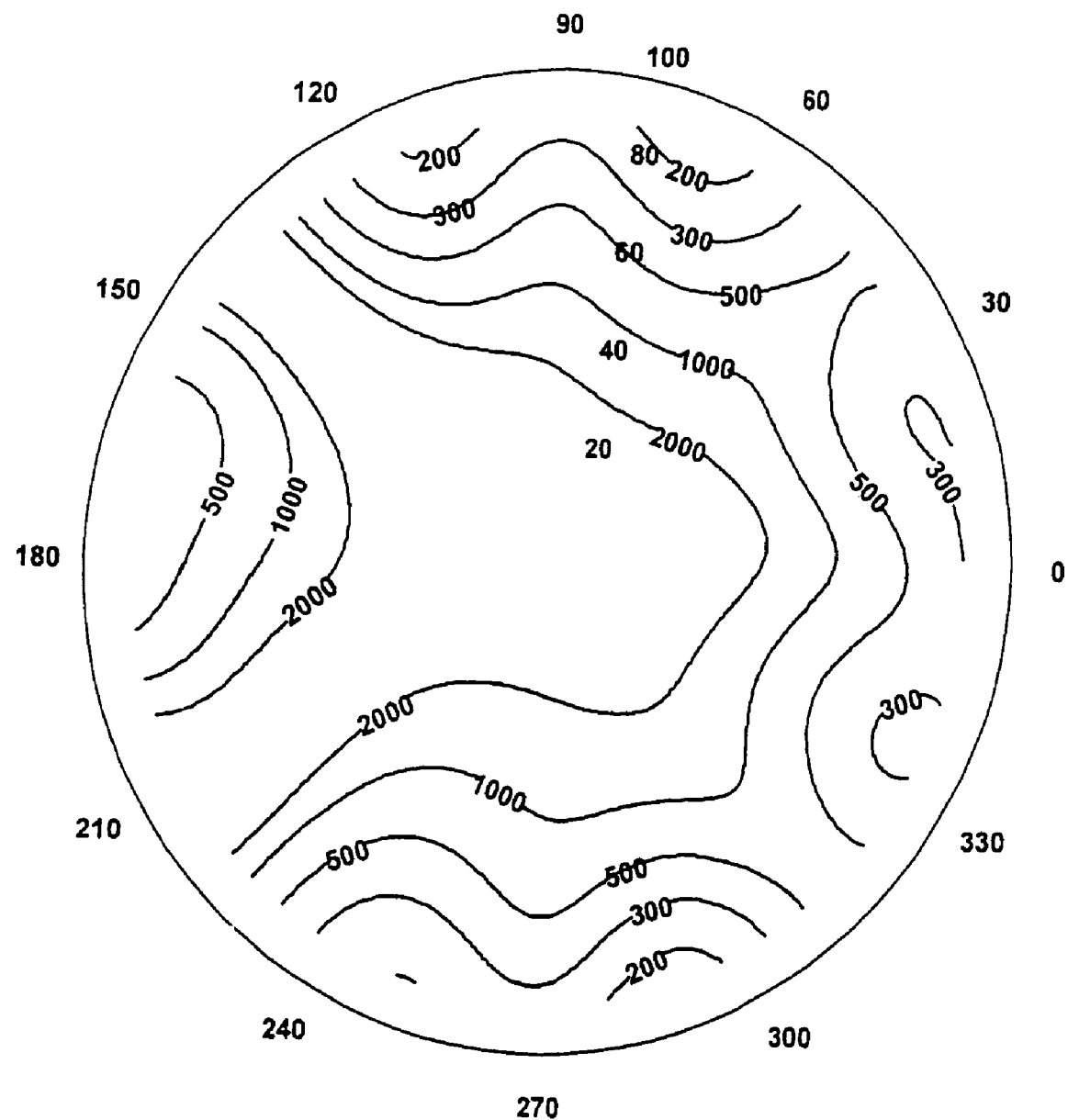
FIG. 12C illustrates a contrast ratio field of view of the multi-film compensated IPS mode LCD of embodiment 1.

FIGS. 12A through 12C illustrate the results of the simulation for IPS-mode LCD having a positive A-film and a negative A-film showing that a contrast ratio approximately larger than 200:1 is achieved in the ±85° viewing cone.

TABLE 2

| Film Type | Film Thickness (μm) | Film Birefringence $\Delta n = n_e - n_o$ | Retardation of film $d\Delta n$ (nm) |
|---|---|---|---|
| Positive A-film | 59.0 | 0.0015 | 88.5 |
| Negative A-film | 59.5 | −0.0015 | −89.3 |

Figure 13:
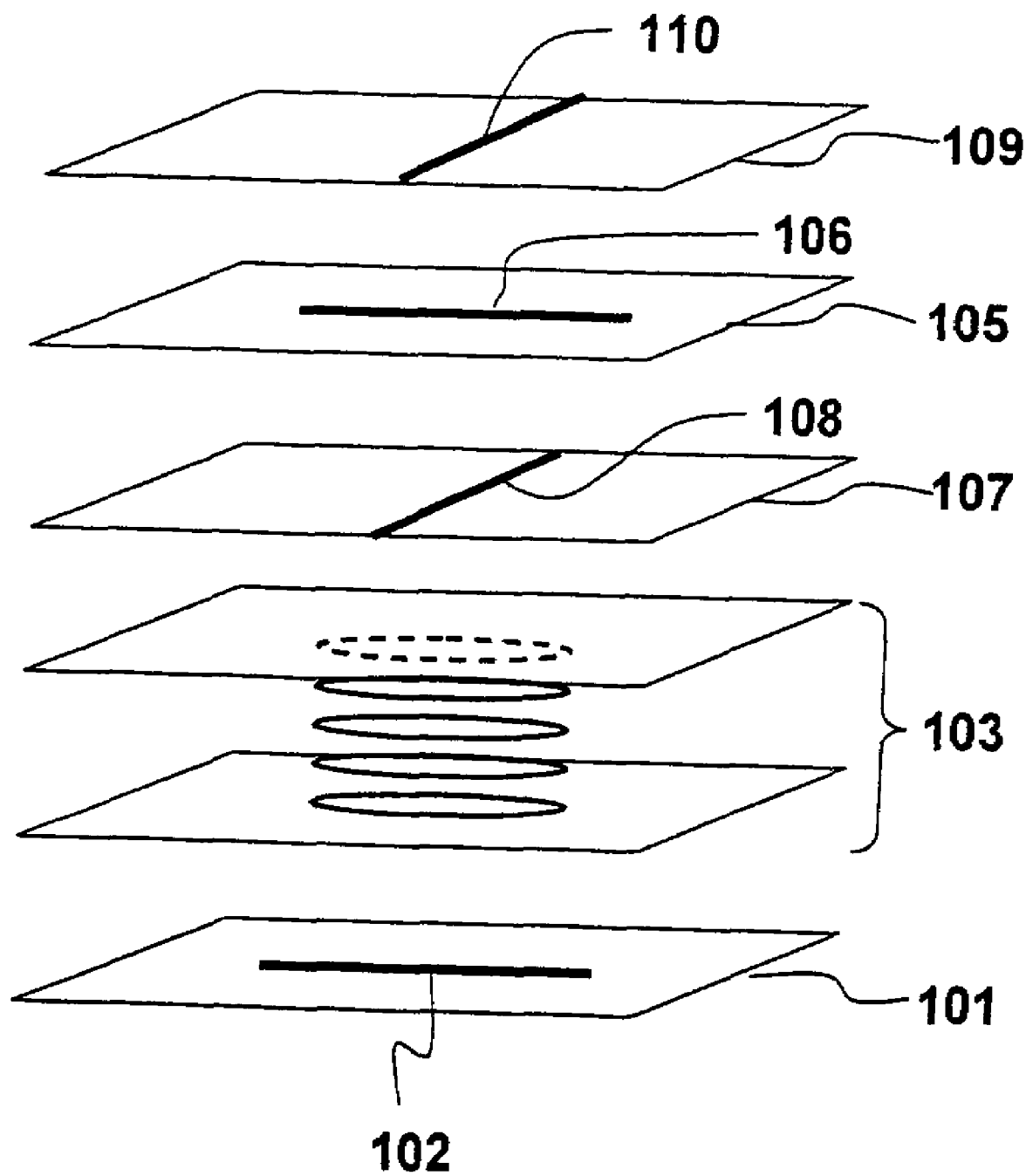
FIG. 13 illustrates a schematic structure of the multi-film compensation IPS (or FFS) mode as described in a second embodiment of the present invention.

In a second embodiment, the position of the positive A-film 105 and the negative A-film 107 are exchanged as illustrated in the schematic structure of FIG. 13. Table 3 lists the optimized film parameters for the positive A-film 105 and the negative A-film 107 used in the structure of FIG. 13.

TABLE 3

| Film Type | Film Thickness (μm) | Film Birefringence $\Delta n = n_e - n_o$ | Retardation of film $d\Delta n$ (nm) |
|---|---|---|---|
| Positive A-film | 56.5 | 0.0015 | 84.8 |
| Negative A-film | 61.5 | −0.0015 | −92.3 |

Figure 14:
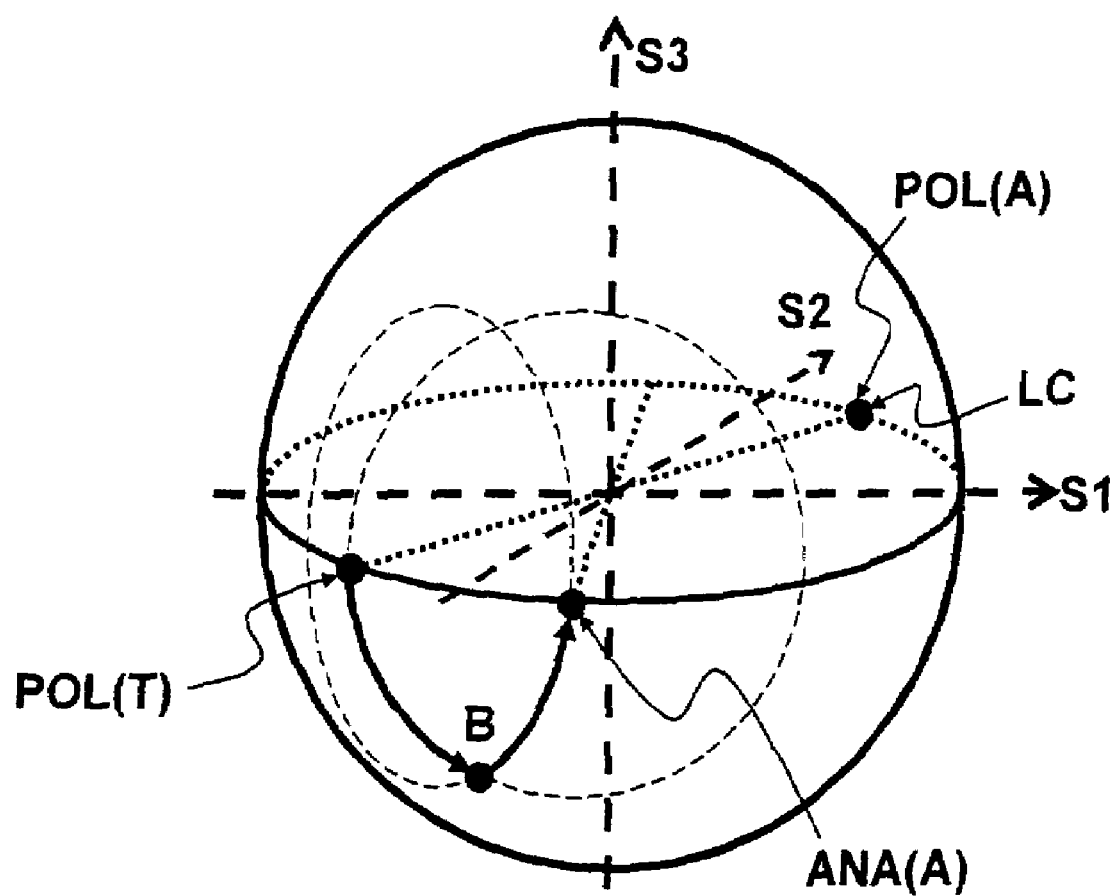
FIG. 14 is a Poincaré sphere representation of an IPS (or FFS) mode LCD with a negative A-film and positive A-film compensation according to FIG. 13.
Figure 15A:
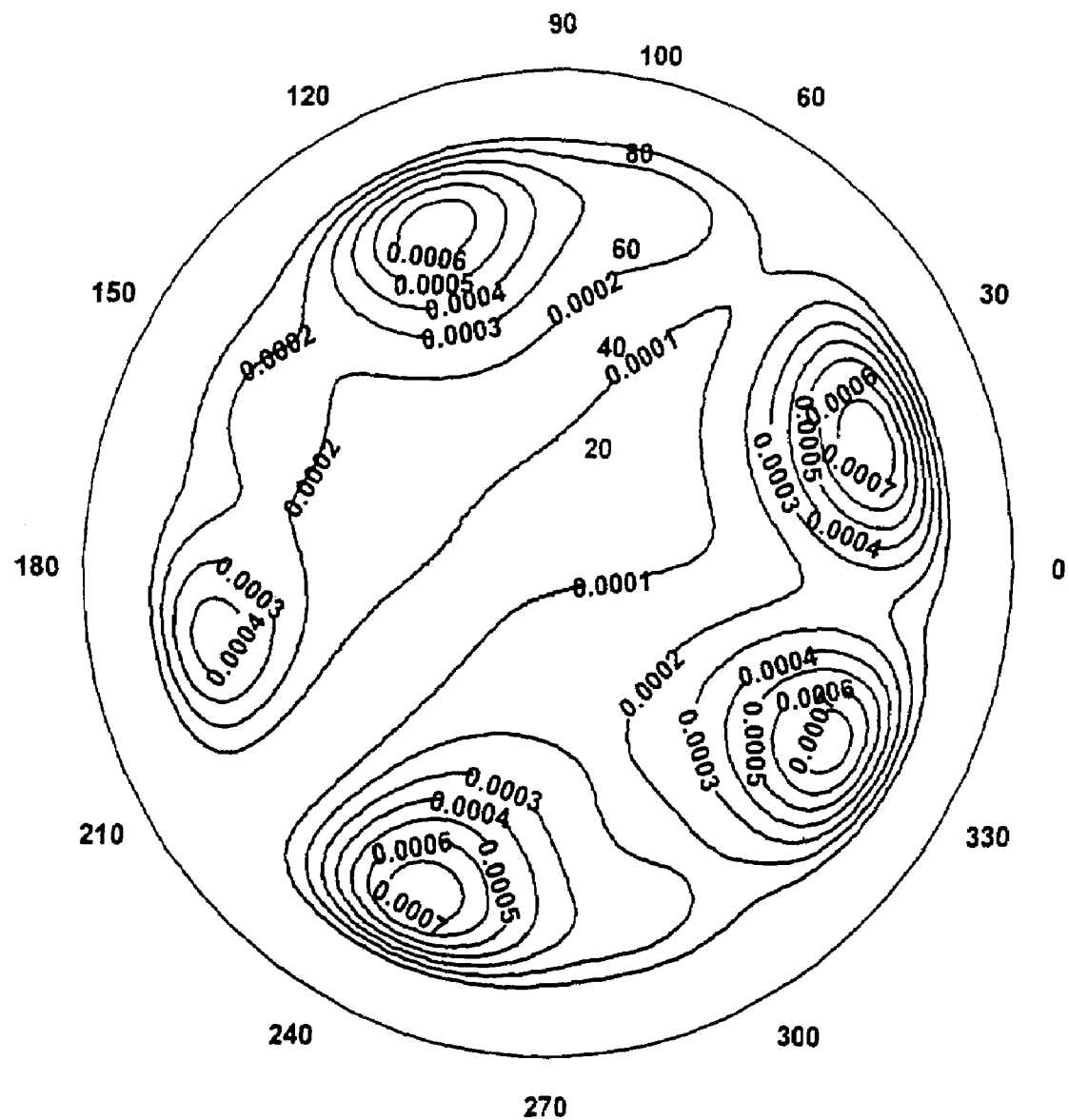
FIGS. 15A and 15B illustrate a field of view of the multi-film compensated IPS mode LCD of embodiment 2 at voltage-off state and at voltage-on state, respectively.
Figure 15B:
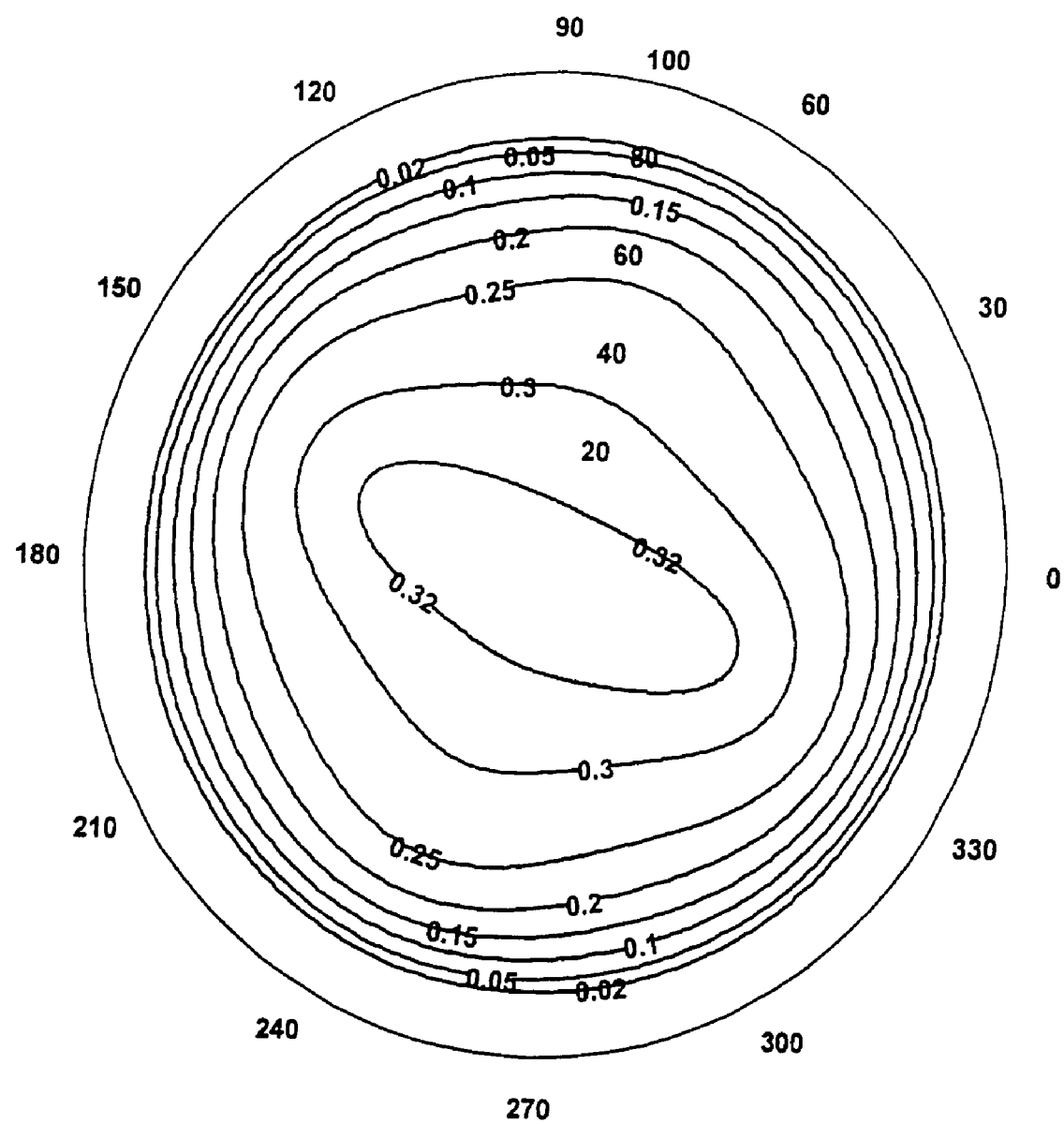
Figure 15C:
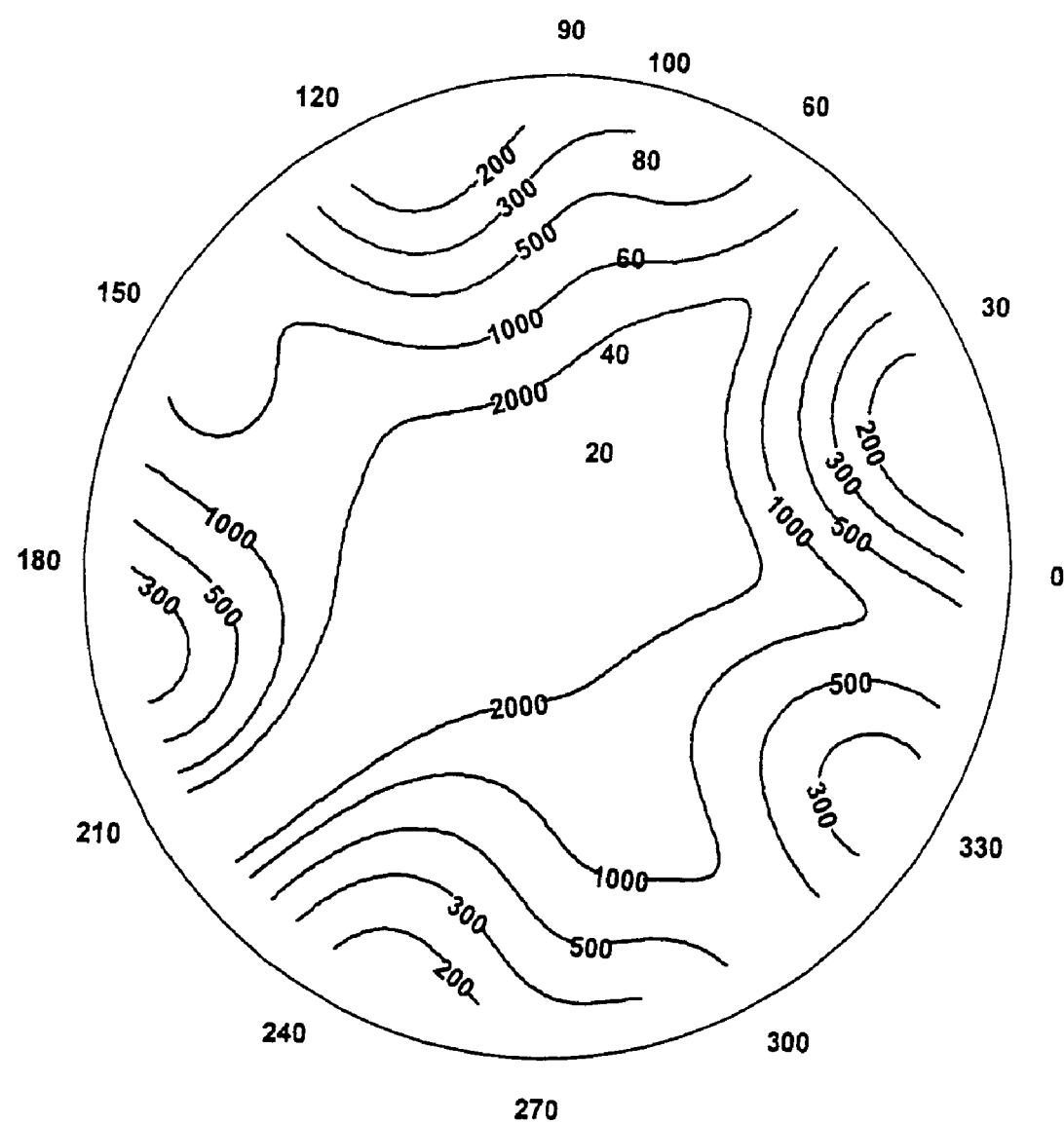
FIG. 15C illustrates a contrast ratio field of view of the multi-film compensated IPS mode LCD of embodiment 2.

The compensation principle for the second embodiment is illustrated by the Poincaré sphere in FIG. 14. FIGS. 15A through 15C show the compensation results showing a contrast ratio that is still larger than approximately 200:1 in the approximately ±80° viewing cone.

Previous examples and embodiments have illustrated the method and apparatus of the present invention wherein the positive A-film 105 and the negative A-film 107 are laminated to the top substrate of the liquid crystal layer 103. However, the compensation films 105, 107 may also be laminated to the bottom substrate of the liquid crystal layer 103.

Figure 16:
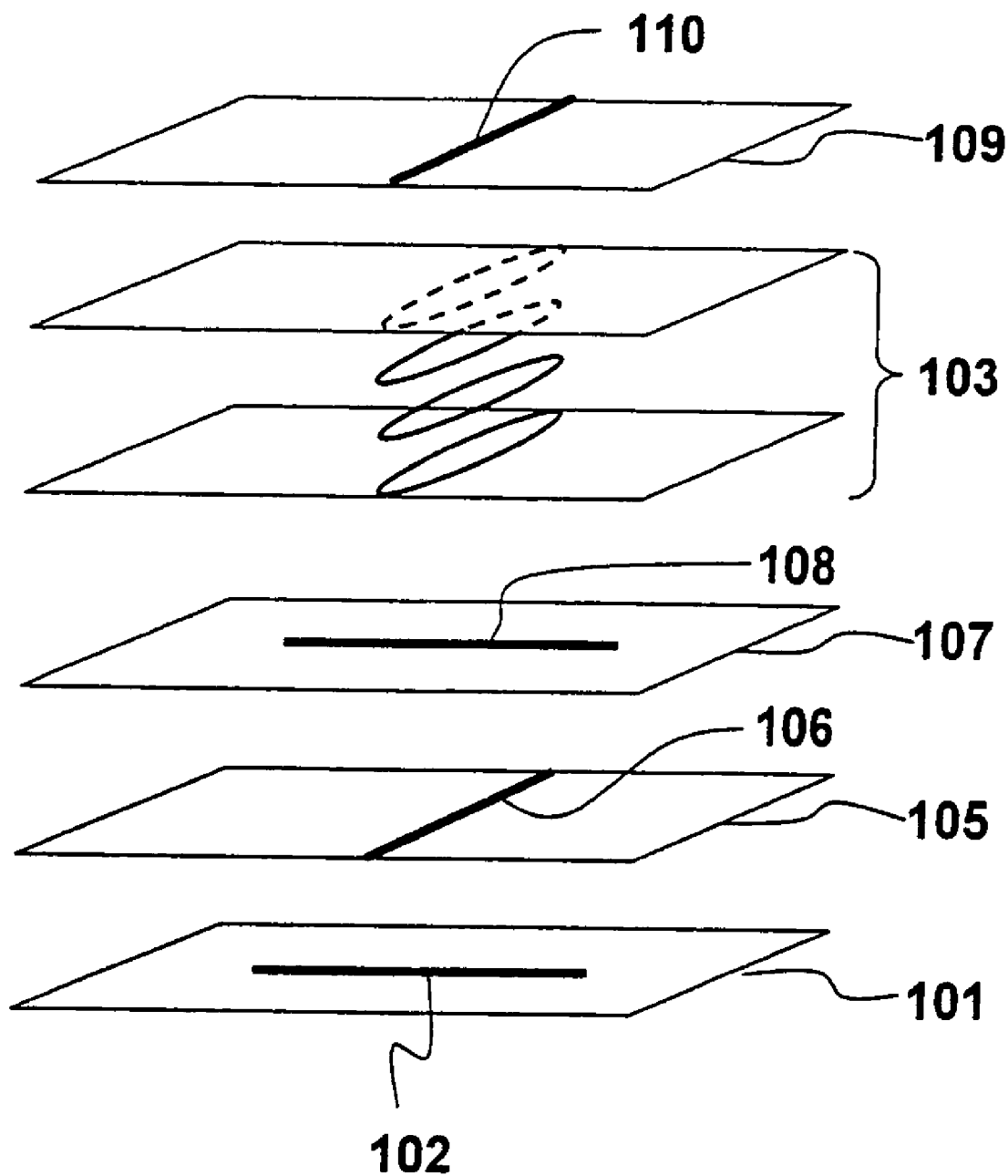
FIG. 16 illustrates a schematic structure of the multi-film compensation IPS (or FFS) mode as described in a third embodiment of the present invention.

FIG. 16 illustrates the structure of the multi-film compensated LCD according to a third embodiment of the present invention. The reason that the compensation films 105, 107 can alternatively be laminated to the bottom substrate of the liquid crystal layer 103 is that after the light passes through the compensation films 105, 107, it becomes linearly polarized light along the absorption direction 110 of the top polarizer 109. As long as the liquid crystal layer 103 does not change the polarization state, the light leakage at off-state is eliminated. To do so, the alignment direction of the liquid crystal layer 103 must be parallel to the absorption direction 110 of the top polarizer 109, as shown in FIG. 16. Table 4 lists the optimized film parameters for the positive A-film 105 and the negative A-film 107.

TABLE 4

| Film Type | Film Thickness (μm) | Film Birefringence $\Delta n = n_e - n_o$ | Retardation of film $d\Delta n$ (nm) |
|---|---|---|---|
| Positive A-film | 62.5 | 0.0015 | 93.8 |
| Negative A-film | 58.5 | −0.0015 | −87.8 |

Figure 17:
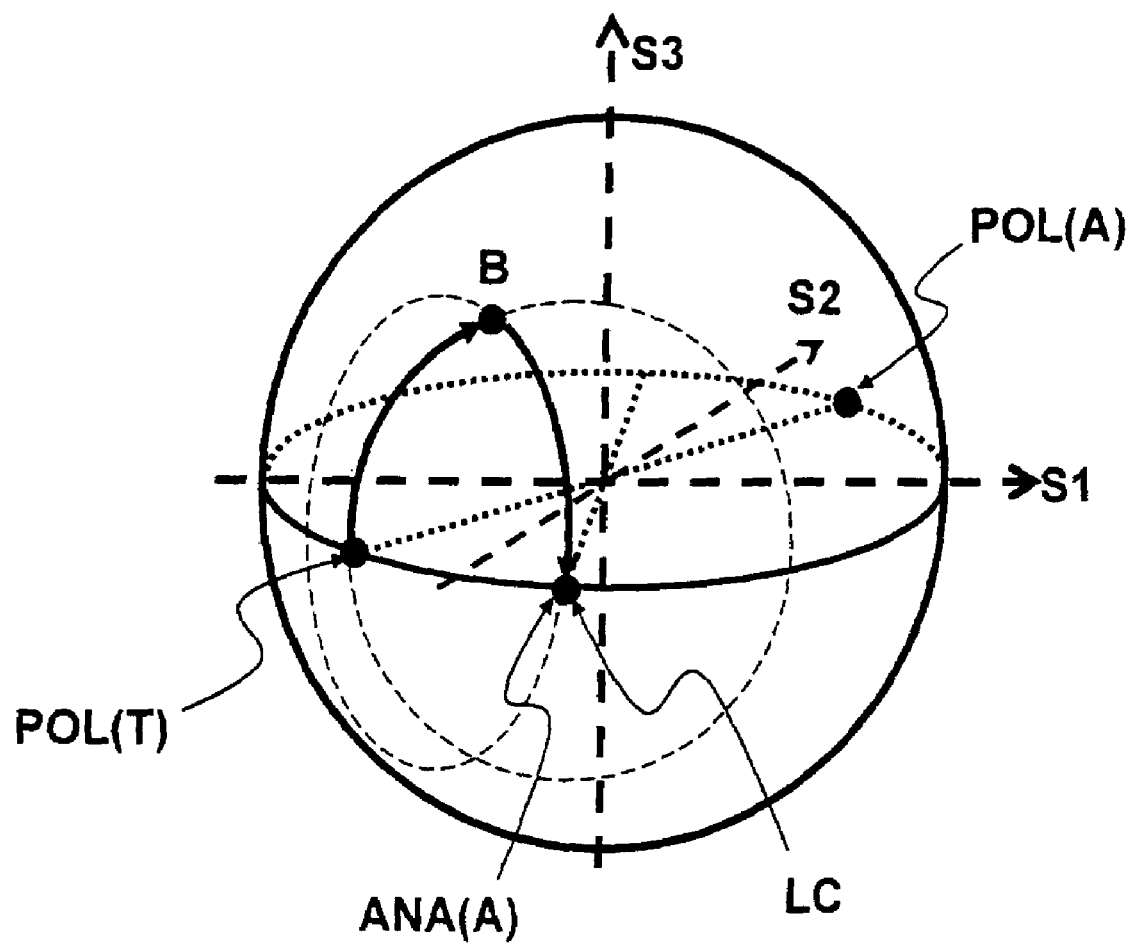
FIG. 17 is a Poincaré sphere representation of an IPS (or FFS) mode LCD with a positive A-film and a negative A-film compensation according to FIG. 16.
Figure 18A:
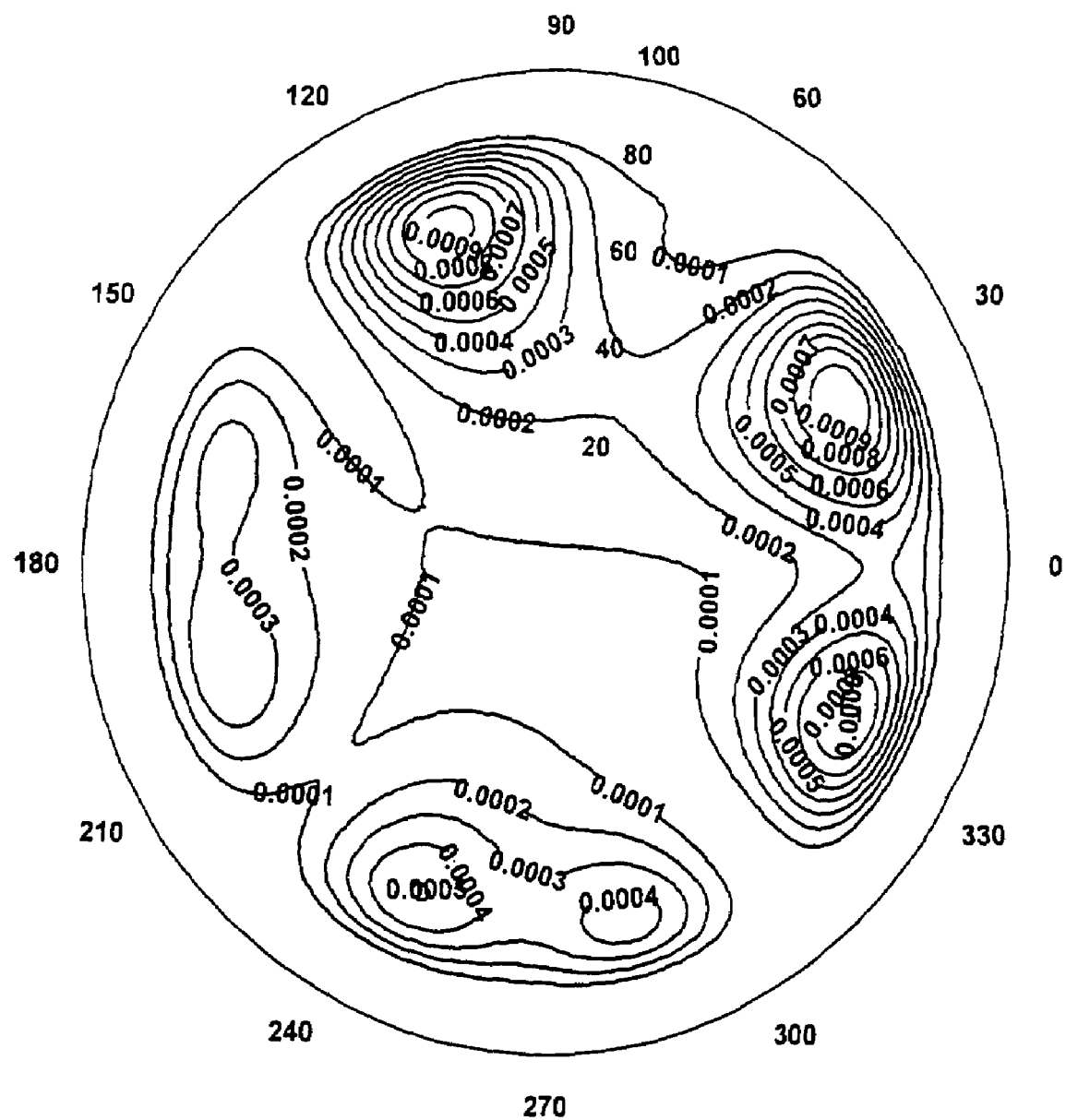
FIGS. 18A and 18B illustrate a field of view of the multi-film compensated IPS mode LCD of embodiment 3 at voltage-off state and at voltage-on state, respectively.
Figure 18B:
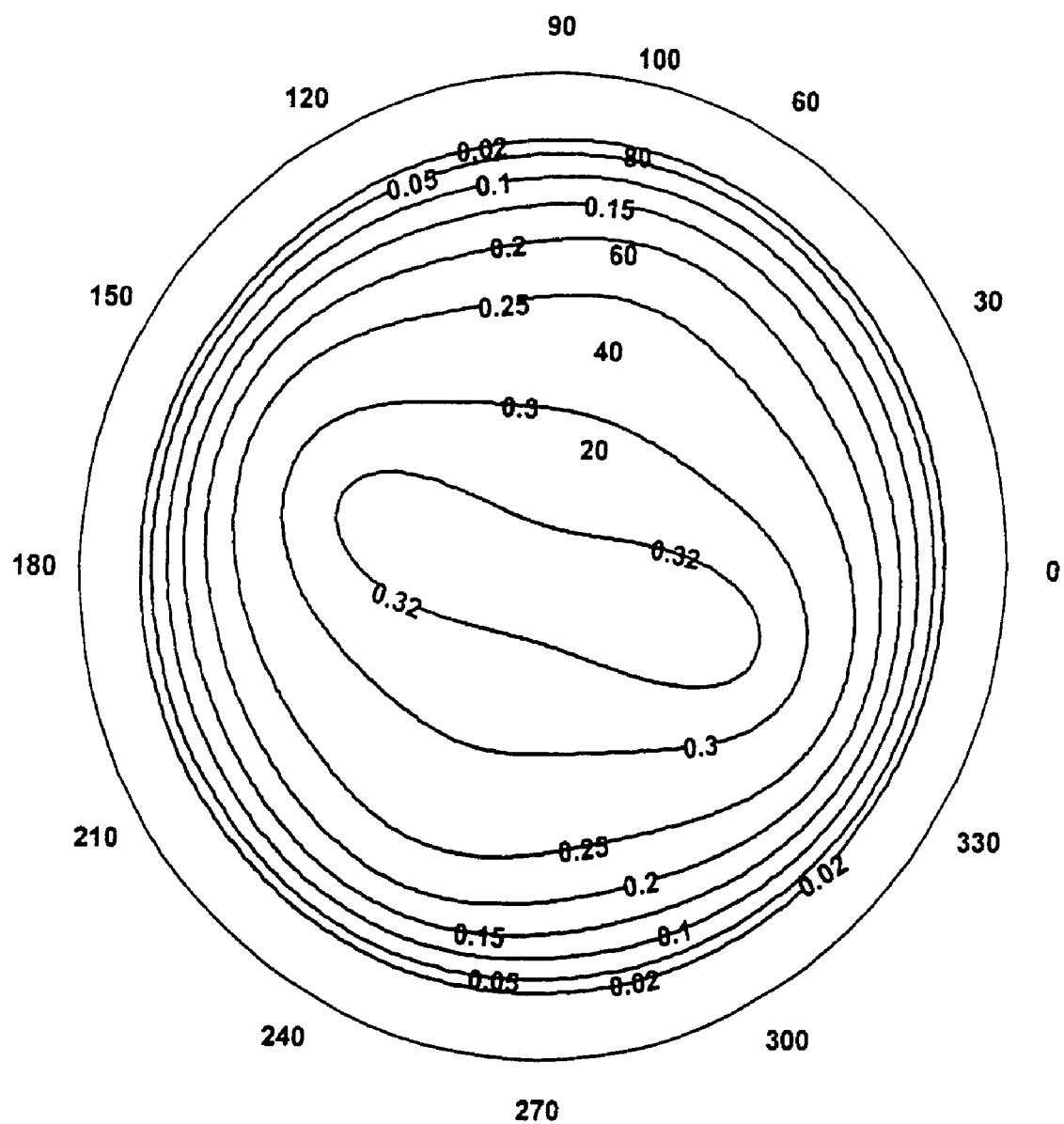
Figure 18C:
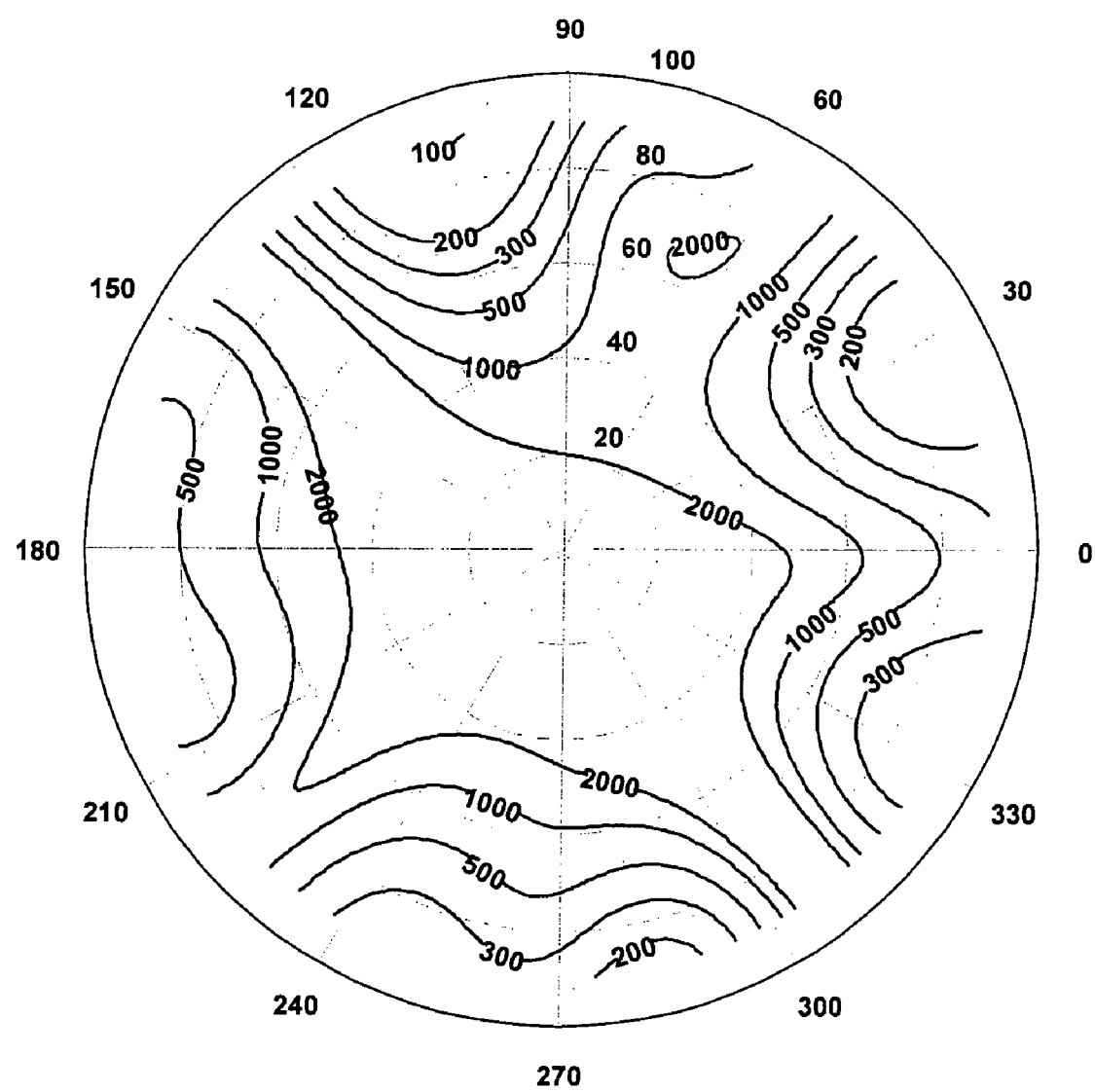
FIG. 18C illustrates a contrast ratio field of view of the multi-film compensated IPS mode LCD of embodiment 3.

The compensation principle corresponding to this third embodiment is illustrated in the Poincaré sphere in FIG. 17. FIGS. 18A to 18C are the calculated results. In this embodiment, the contrast ratio results are slightly lower than the results for the first and second embodiments of the invention. However, in substantially all polar angles, the contrast ratio is larger than approximately 100:1.

Figure 19:
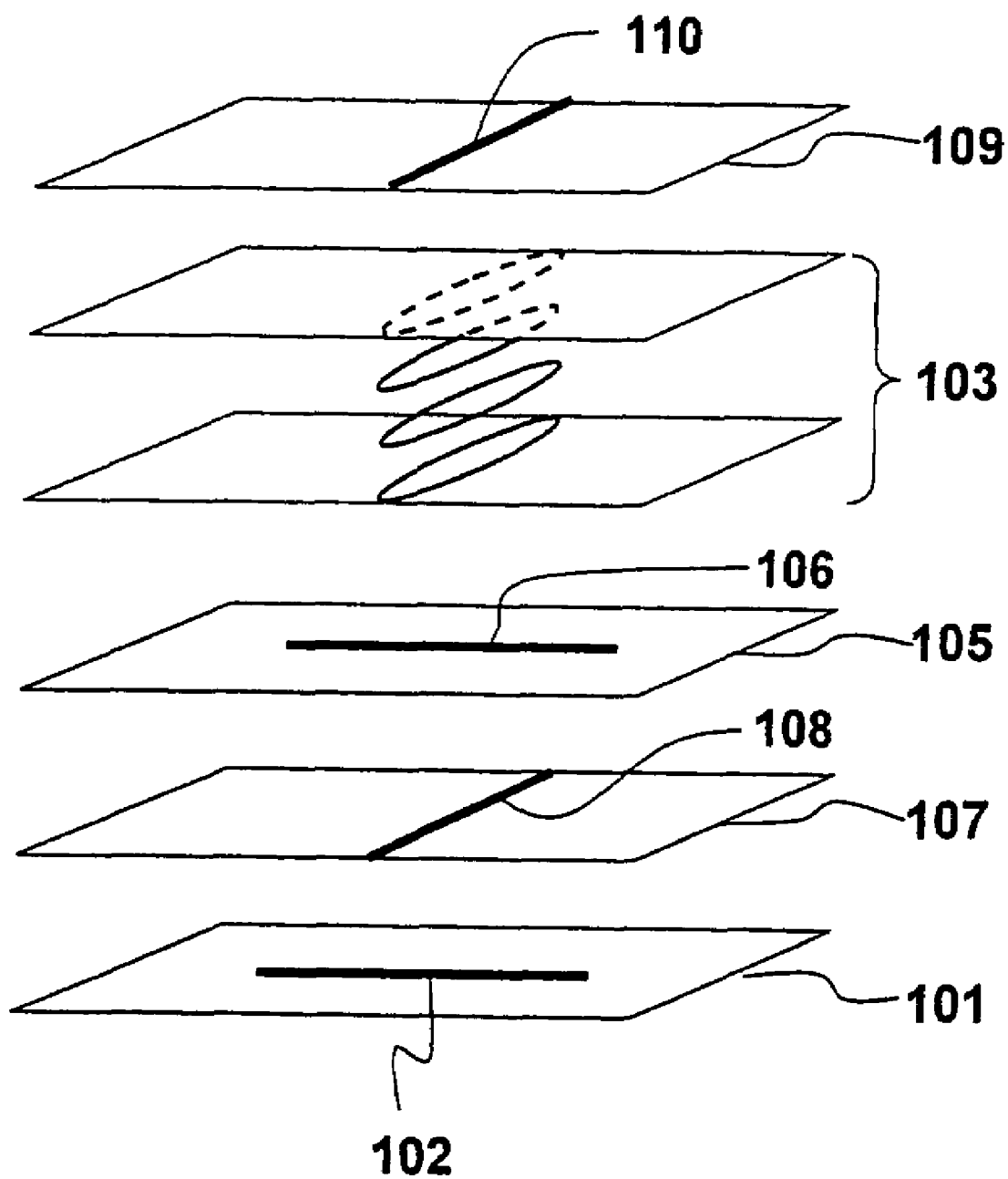
FIG. 19 illustrates a schematic structure of the multi-film compensation IPS (or FFS) mode as described in a fourth embodiment of the present invention.
Figure 20:
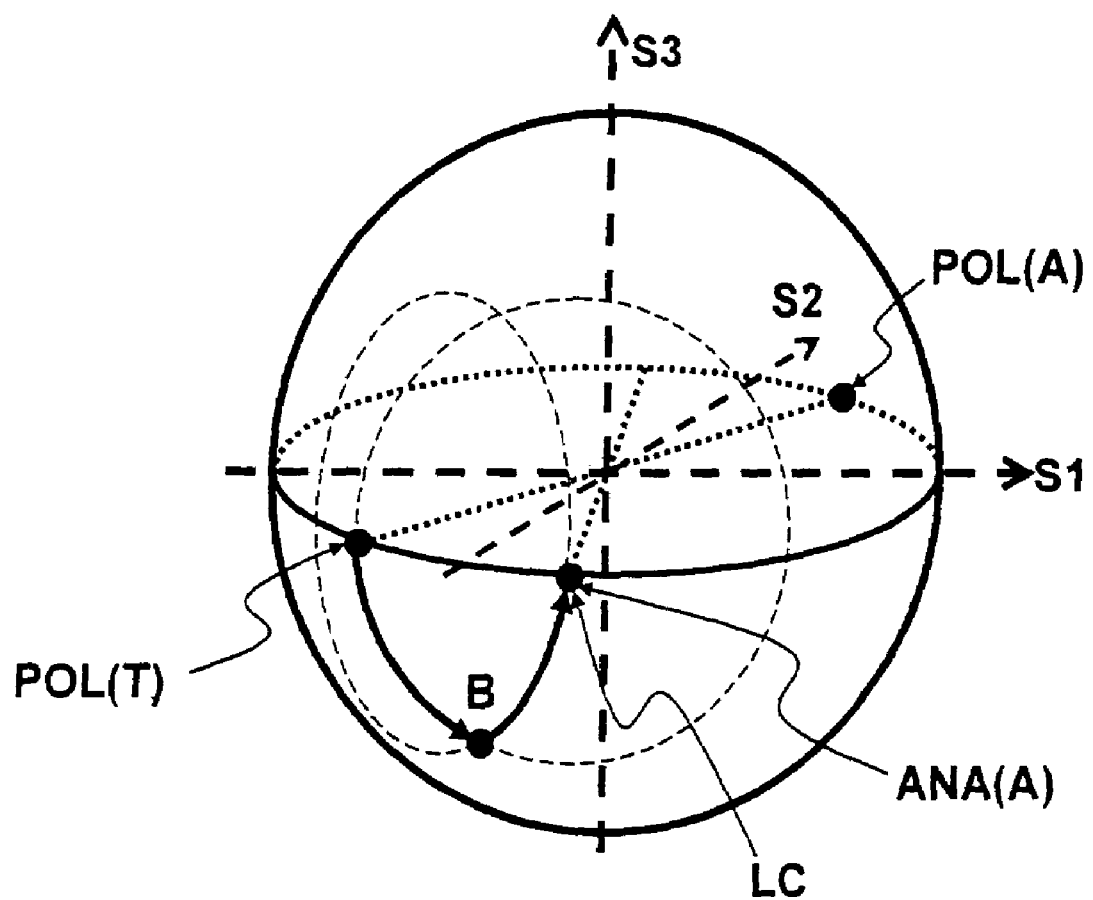
FIG. 20 is a Poincaré sphere representation of an IPS (or FFS) mode LCD with a negative A-film and a positive A-film compensation according to FIG. 19.

As previously disclosed in embodiment two, the position of the positive A-film 105 and the negative A-film 107 can be exchanged. FIG. 19 illustrates the apparatus configuration as the fourth embodiment. Compared to embodiment 3, the positions of the positive A-film 105 and the negative A-film 107 in this fourth embodiment are exchanged. FIG. 20 shows the compensation principle of this fourth embodiment and Table 5 is a lists the optimal film parameters from positive A-film 105 and negative A-film 107.

TABLE 5

| Film Type | Film Thickness (μm) | Film Birefringence $\Delta n = n_e - n_o$ | Retardation of film $d\Delta n$ (nm) |
|---|---|---|---|
| Positive A-film | 56.0 | 0.0015 | 84.0 |
| Negative A-film | 63.0 | −0.0015 | −94.5 |

Figure 21A:
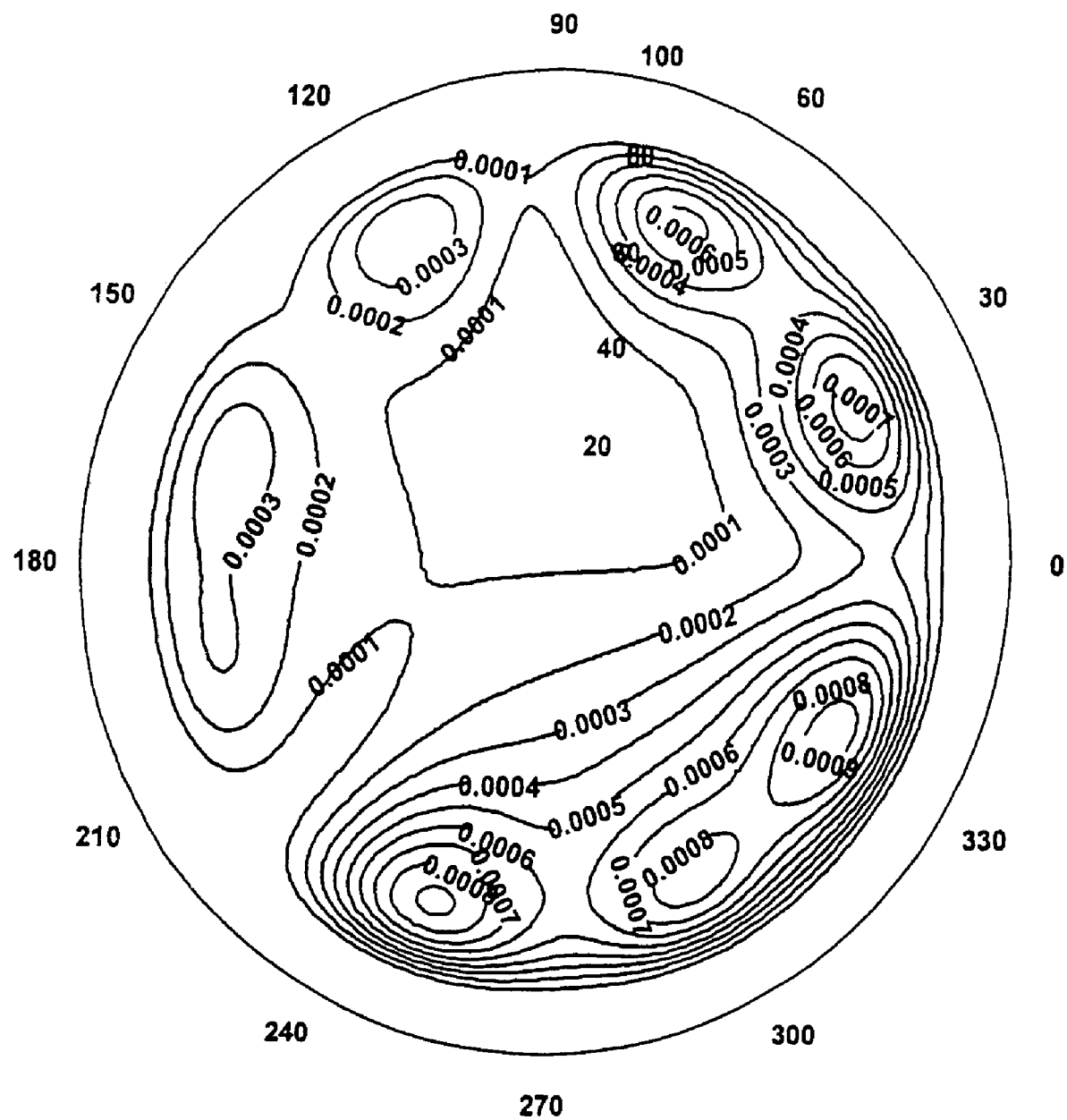
FIGS. 21A and 21B illustrate a field of view of the multi-film compensated IPS mode LCD of embodiment 4 at voltage-off state and at voltage-on state, respectively.
Figure 21B:
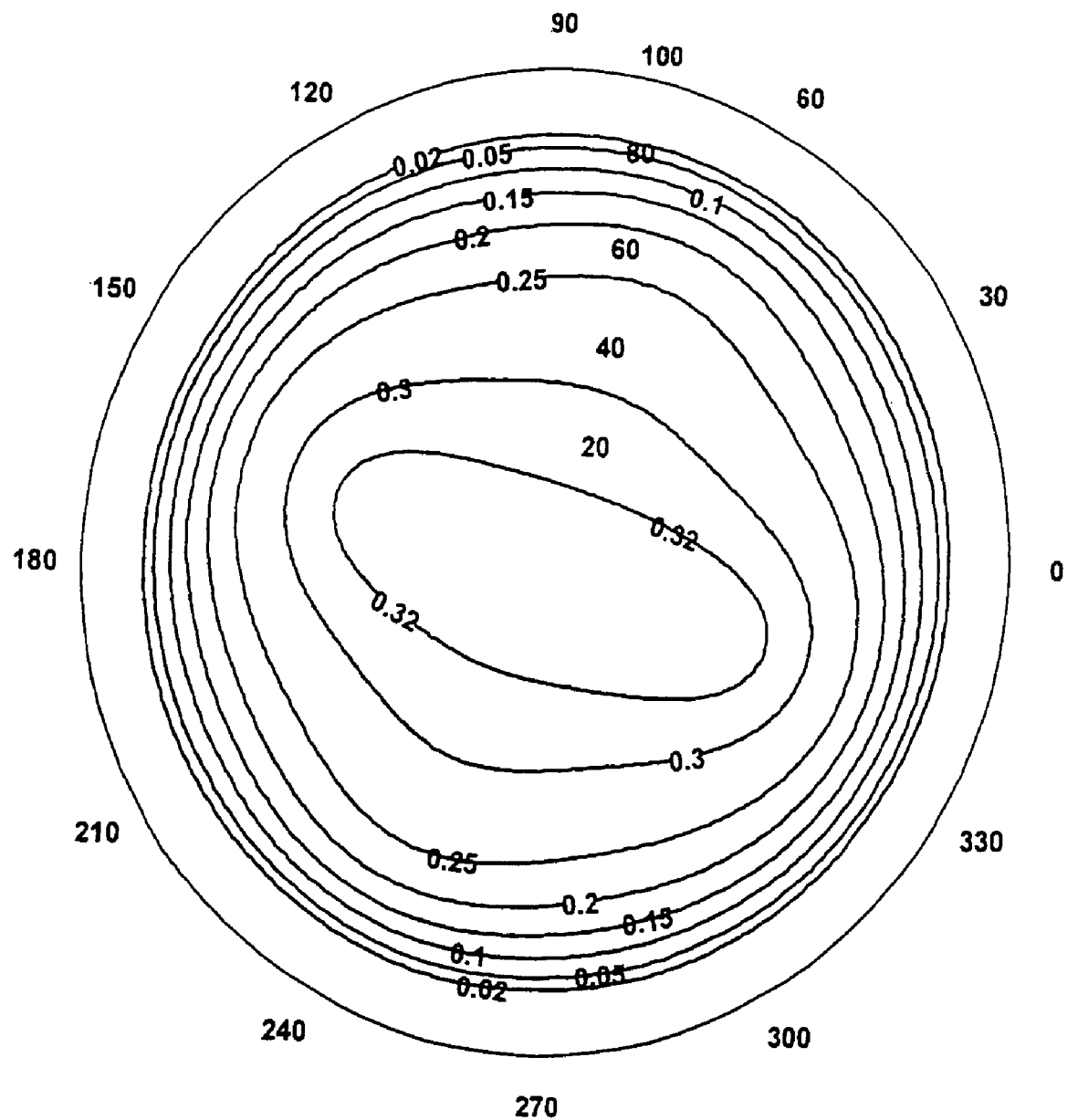
Figure 21C:
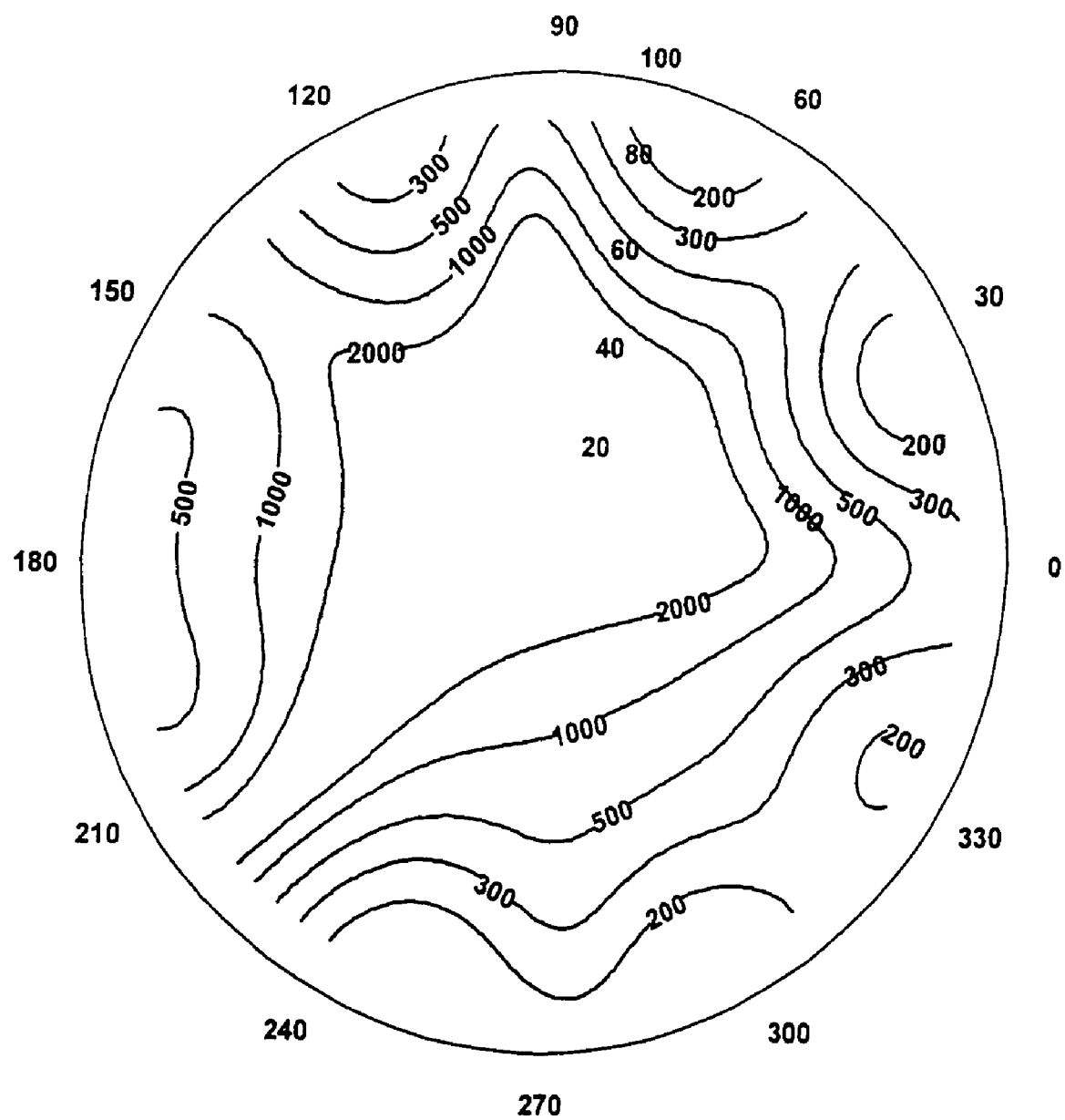
FIG. 21C illustrates a contrast ratio field of view of the multi-film compensated IPS mode LCD of embodiment 4.

The compensation results for the fourth embodiment are illustrated in FIGS. 21A through 21C. As with the third embodiment, a contrast ratio of 100:1 is obtained for substantially all polar angles.

Figure 22:
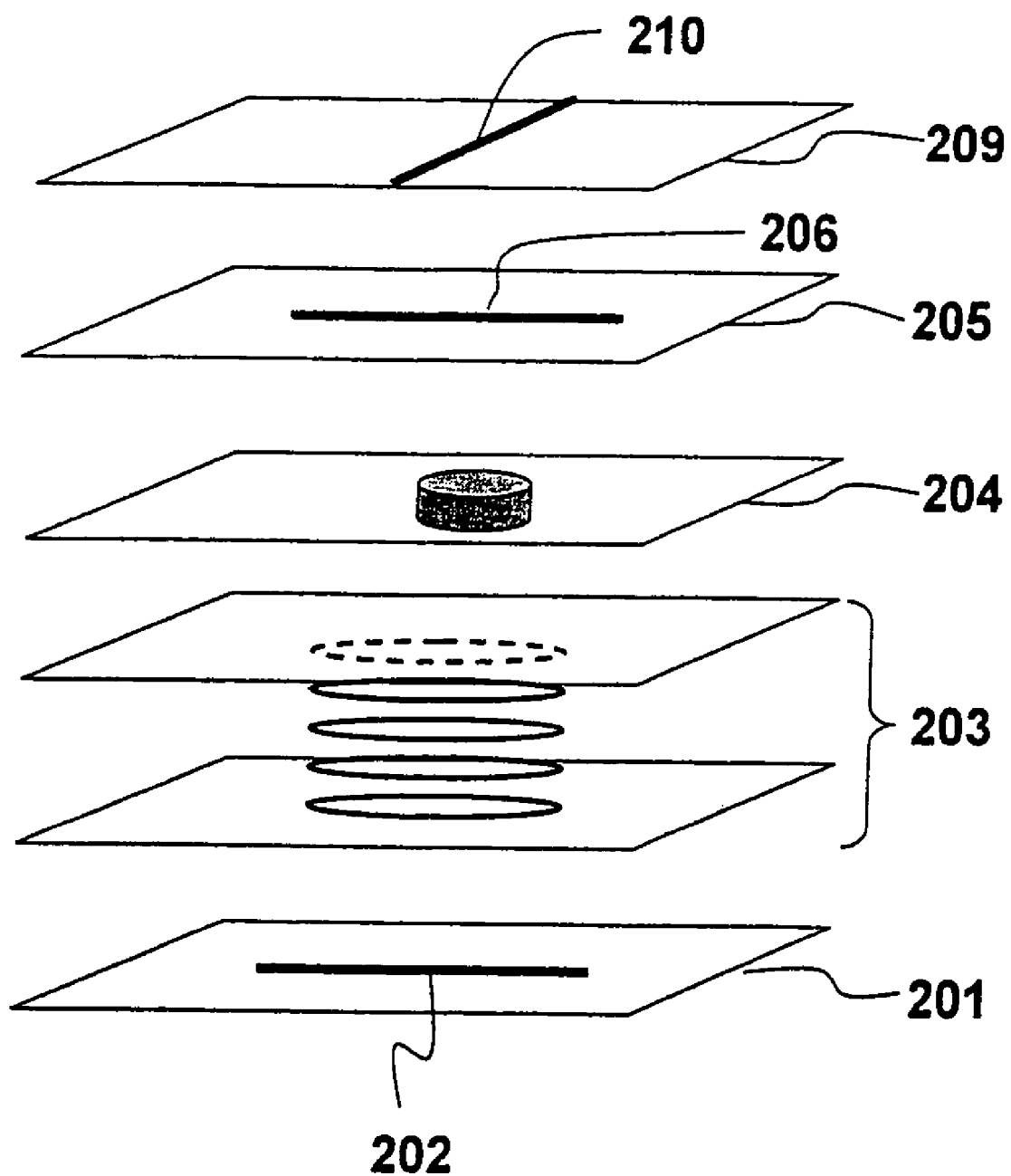
FIG. 22 illustrates a schematic structure of the multi-film compensation IPS (or FFS) mode as described in the prior art.

For the purpose of comparison, FIG. 22 illustrates a prior art compensation scheme for an IPS LCD using a positive C-film 204 and a positive A-film 205. In the prior art, the absorption axis 202 of bottom polarizer 201 and the absorption axis 210 of the top polarizer 209 are also perpendicular with each other. The optical axis 206 of the positive A-film 205 is perpendicular to the absorption axis 210 of the top polarizer 209.

Figure 23:
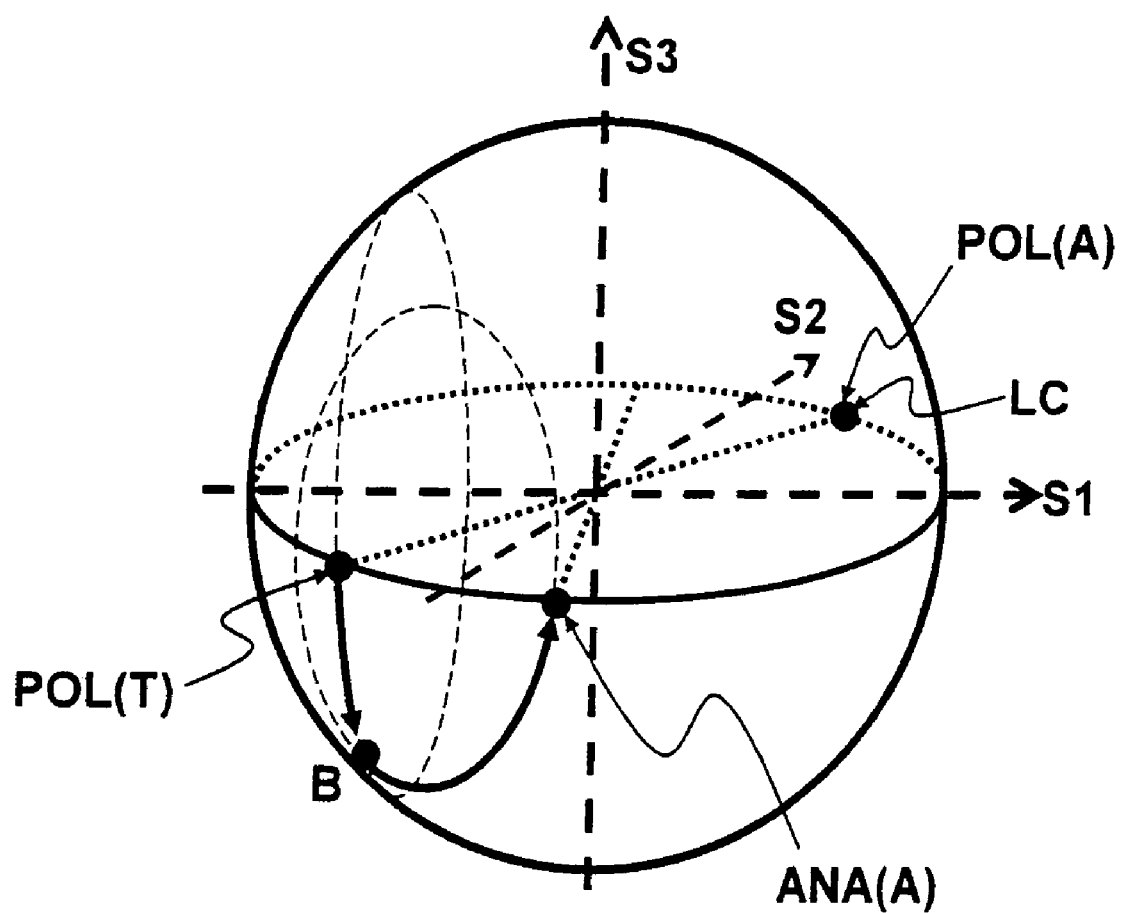
FIG. 23 is a Poincaré sphere representation of an IPS (or FFS) mode LCD with a positive C-film and a positive A-film compensation according to FIG. 22.

The optical axis of the positive C-film 204 is perpendicular the surface plane of the positive C-film 204. That means the optical axis of the positive C-film 204 is along the surface normal direction of the positive C-film 204. FIG. 23 illustrates the compensation principle in Poincaré sphere representation corresponding to the prior art compensation scheme of FIG. 22. Table 6 lists the parameters of the positive A-film and the positive C-film compensation film used in the prior art.

TABLE 6

| Film Type | Film Thickness (μm) | Film Birefringence $\Delta n = n_e - n_o$ | Retardation of film $d\Delta n$ (nm) |
|---|---|---|---|
| Positive A-film | 87.0 | 0.0015 | 130.5 |
| Positive C-film | 56.5 | −0.0015 | 84.8 |

Figure 24A:
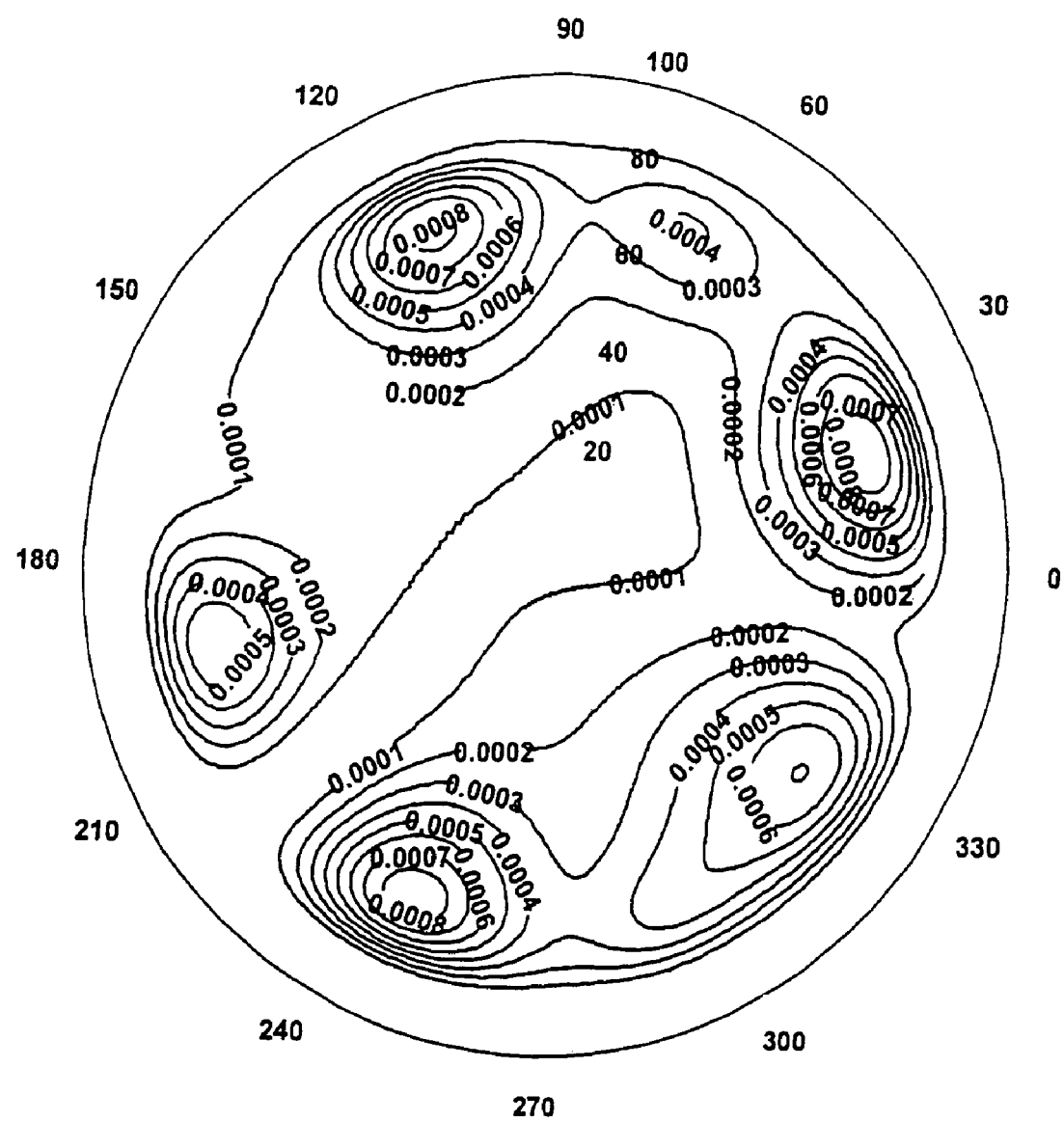
FIGS. 24A and 24B illustrate a field of view of the multi-film compensated IPS mode LCD of the prior art at voltage-off state and at voltage-on state, respectively
Figure 24B:
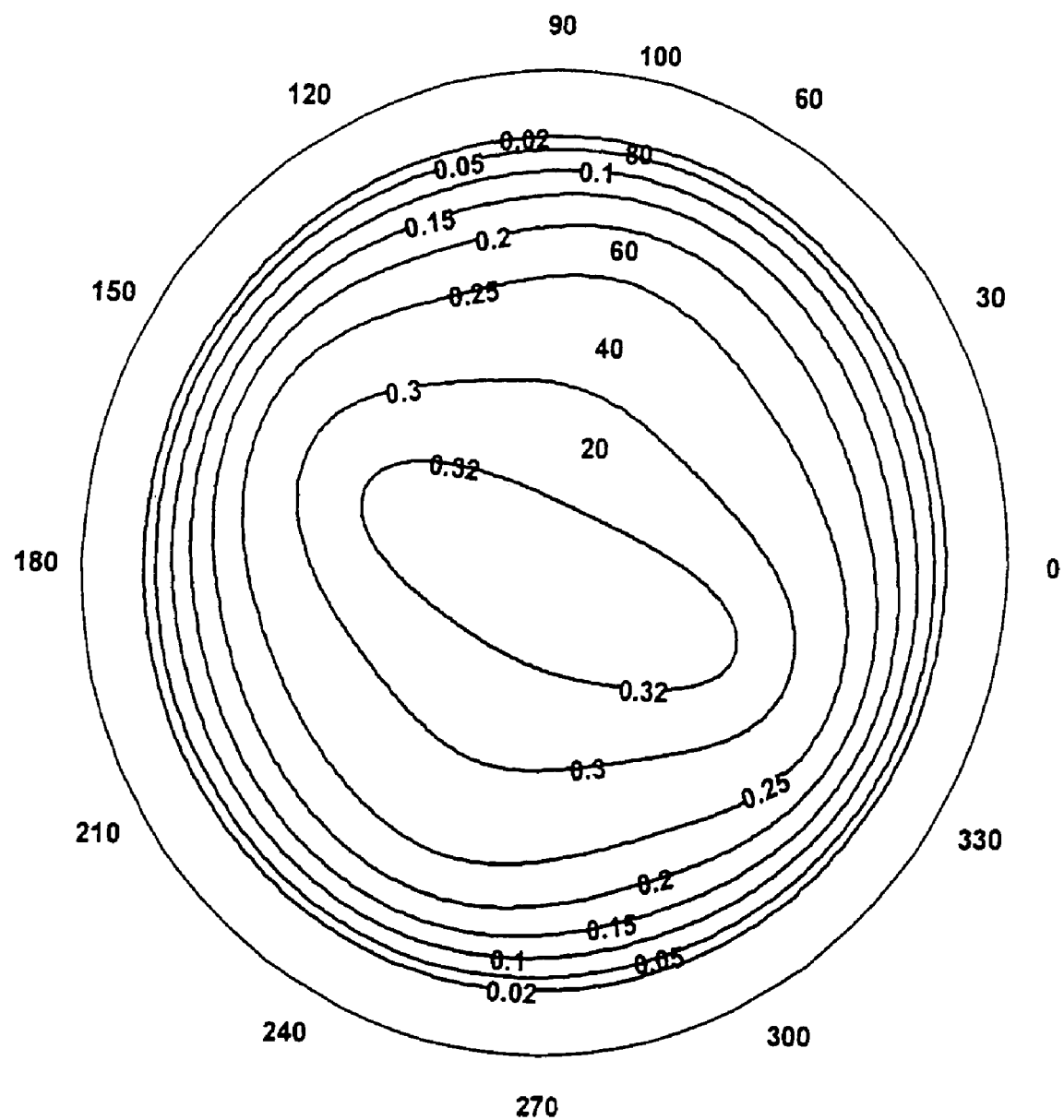
Figure 24C:
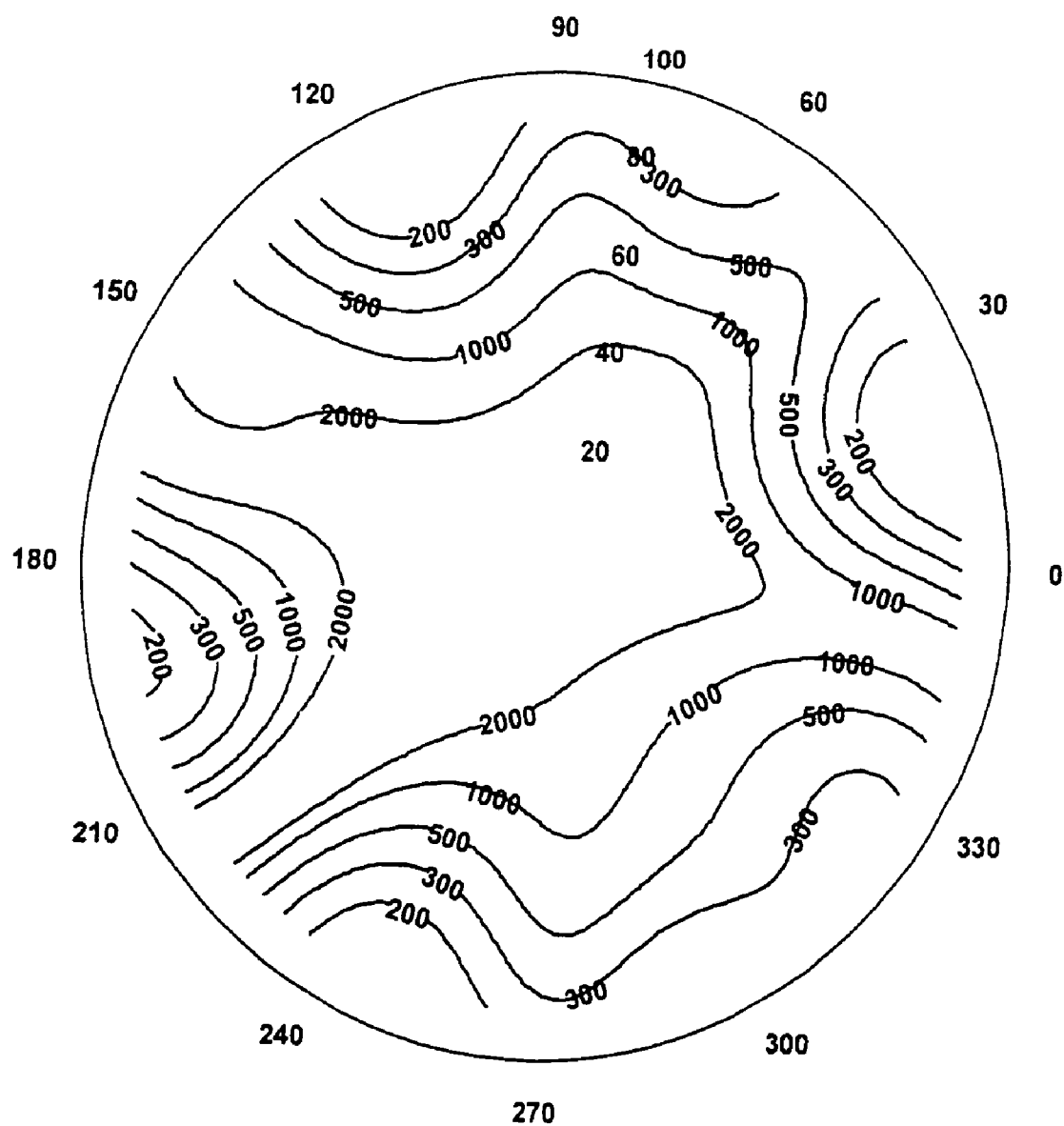
FIG. 24C illustrates a contrast ratio field of view of the multi-film compensated IPS mode LCD of the prior art.

The resulting dark state, bright state transmission, and contrast ratio of the prior art are plotted in FIGS. 24A through 24C, respectively. The largest light leakage in FIG. 24A is approximately 33 percent larger than the light leakage shown in FIG. 12A. Additionally, the viewing angle corresponding to the 200:1 contrast ratio in embodiment 1 is 10° wider than that of the prior art as shown when FIGS. 12C and 24C are compared. More importantly, the negative A-film in embodiments 1 through 4 of this invention has a much lower cost than C-film and performs better for enlarging the viewing angle of the IPS and the FFS LCDs.

The method and apparatus of the present invention laminates one of a top substrate and a bottom substrate of the liquid crystal layer with a positive A-film and a negative A-film. The multi-film compensated liquid crystal displays of the present invention increases the contrast ratio for a larger viewing angle at a reduced cost.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A method for increasing the viewing angle of a liquid crystal display, consisting essentially of the steps of:
   providing a first substrate with alignment film having a first polarizer laminated on an outside surface, wherein the first polarizer faces a light source;
   providing a second substrate with alignment film having a second polarizer laminated on an outside surface, wherein the second polarizer faces an observer;
   sandwiching a liquid crystal layer between the first substrate and the second substrate;
   applying a positive birefringence uniaxial A-film, having its optical axis parallel to the positive birefringence uniaxial A-film surface plane and having a retardation value $d\Delta n/\lambda$ between approximately 0.05 and approximately 0.25, where $\lambda$ is the wavelength of incident light, d is the thickness of the positive birefringence uniaxial A-film and $\Delta n=n_e-n_o$ is birefringence of the positive birefringence uniaxial A-film, between the liquid crystal layer and one of the first polarizer and the second polarizer; and
   applying a negative birefringence uniaxial A-film having its optical axis parallel to the negative birefringence uniaxial A-film surface plane, directly adjacent to the positive birefringence uniaxial A-film, wherein the positive birefringence uniaxial A-film and the negative birefringence uniaxial A-film are located between the first polarizer and the second polarizer laminated on one of the first and second substrates within the liquid crystal display without a polarizer beam splitter, and wherein the optical axis of the positive birefringence uniaxial A-film is approximately perpendicular to the optical axis of the negative birefringence uniaxial A-film.

2. The method of claim 1, further comprising the step of:
   integrating the positive birefringence uniaxial A-film and the negative birefringence uniaxial A-film with a liquid crystal display having a homogenously aligned liquid crystal layer at voltage-off state, wherein the liquid crystal layer is driven by a substantially lateral electrical field.

3. The method of claim 1, further comprising the step of:
   locating the positive birefringence uniaxial A-film, the negative birefringence uniaxial A-film and the liquid crystal layer between two orthogonally crossed polarizers.

* * * * *